US011743578B2

(12) United States Patent
Mysore et al.

(10) Patent No.: US 11,743,578 B2
(45) Date of Patent: Aug. 29, 2023

(54) SYSTEMS AND METHODS OF POWER-MANAGEMENT ON SMART DEVICES

(71) Applicant: GOOGLE LLC, Mountain View, CA (US)

(72) Inventors: Sahana Mysore, Mountain View, CA (US); Jacobi Grillo, Mountain View, CA (US); Mikko Pekka Sannala, Mountain View, CA (US); Robinder Virk, Mountain View, CA (US); William Saperstein, Mountain View, CA (US)

(73) Assignee: Google LLC, Mountain View, CA (US)

( * ) Notice: Subject to any disclaimer, the term of this patent is extended or adjusted under 35 U.S.C. 154(b) by 302 days.

(21) Appl. No.: 17/066,264

(22) Filed: Oct. 8, 2020

(65) Prior Publication Data
US 2021/0029298 A1   Jan. 28, 2021

Related U.S. Application Data

(63) Continuation of application No. PCT/US2018/040781, filed on Jul. 3, 2018.
(Continued)

(51) Int. Cl.
*H04N 23/65* (2023.01)
*G06V 20/52* (2022.01)
*H04N 23/66* (2023.01)

(52) U.S. Cl.
CPC ........ *H04N 23/651* (2023.01); *G06V 20/52* (2022.01); *H04N 23/66* (2023.01)

(58) Field of Classification Search
CPC ......... H04N 5/23219; H04N 5/232411; H04N 5/23203; H04N 23/651; H04N 23/66;
(Continued)

(56) References Cited

U.S. PATENT DOCUMENTS 7,784,080 B2   8/2010  Renkis
8,780,201 B1 *  7/2014  Scalisi ............... H04N 7/186
                                                         348/143
(Continued)

FOREIGN PATENT DOCUMENTS

CN   101065980 A   10/2007
CN   102143356 A    8/2011
(Continued)

OTHER PUBLICATIONS

"Foreign Office Action", EP Application No. 18745774.2, dated Jul. 26, 2022, 5 pages.
(Continued)

*Primary Examiner* — Luong T Nguyen
(74) *Attorney, Agent, or Firm* — Colby Nipper PLLC

(57) ABSTRACT

The various embodiments described herein include methods, devices, and systems for power-management on camera devices. In one aspect, a method is performed at a camera device having memory, one or more processors, and an image sensor. The method includes: (1) while a wireless communication component of the camera device is deactivated: (a) capturing a plurality of images containing a motion event; (b) characterizing the motion event; and (c) determining, based on the characterization of the motion event, whether to send video data to a remote computing system; and (2) in accordance with a determination to send video data to the remote computing system: (i) activating the wireless communication component of the camera device; (ii) establishing a wireless connection to the remote computing system via the wireless communication component; and (iii) sending video information to the remote computing system via the established wireless connection.

30 Claims, 17 Drawing Sheets

Related U.S. Application Data

(60) Provisional application No. 62/663,149, filed on Apr. 26, 2018.

(58) Field of Classification Search
CPC ........ G08B 13/19671; G08B 13/19669; G08B 13/19656; G06V 20/52
See application file for complete search history.

(56) References Cited

U.S. PATENT DOCUMENTS

| | | | |
|---|---|---|---|
| 9,449,229 B1 * | 9/2016 | Laska | H04W 4/80 |
| 9,880,611 B2 | 1/2018 | Zha et al. | |
| 10,046,228 B2 * | 8/2018 | Tran | A42B 3/30 |
| 2005/0244033 A1 * | 11/2005 | Ekin | H04N 7/181 382/103 |
| 2009/0207247 A1 | 8/2009 | Zampieron et al. | |
| 2011/0090377 A1 * | 4/2011 | Smith | G06V 20/63 348/241 |
| 2014/0021909 A1 | 1/2014 | Klawon et al. | |
| 2017/0076571 A1 * | 3/2017 | Borel | H04N 21/8153 |
| 2018/0359451 A1 * | 12/2018 | Siminoff | H04N 5/2256 |

FOREIGN PATENT DOCUMENTS

| | | |
|---|---|---|
| CN | 102375440 A | 3/2012 |
| CN | 102938540 A | 2/2013 |
| CN | 103795970 | 5/2014 |
| CN | 104010170 A | 8/2014 |
| CN | 104135645 A | 11/2014 |
| CN | 105163095 | 12/2015 |
| CN | 105308657 | 2/2016 |
| CN | 105472353 | 4/2016 |
| CN | 106228724 | 12/2016 |
| CN | 106603969 | 4/2017 |
| CN | 107810462 A | 3/2018 |
| CN | 207182596 | 4/2018 |
| GB | 2545673 A | 6/2017 |
| JP | 2005073094 A | 3/2005 |
| WO | 99/45710 A1 | 9/1999 |
| WO | WO-2017175924 A1 * | 10/2017 ....... G08B 13/19608 |

OTHER PUBLICATIONS

First Office Action and Search Report, and translation thereof, from counterpart Chinese Application No. 201880092441.5, dated Aug. 4, 2021, 24 pp.

International Search Report and Written Opinion of International Application No. PCT/US2018/040781, dated Jan. 21, 2019, 10 pp.

International Preliminary Report on Patentability from International Application No. PCT/US2018/040781, dated Oct. 27, 2020, 7 pp.

"Foreign Office Action", CN Application No. 201880092441.5, dated Feb. 17, 2022, 28 pages.

"Foreign Office Action", EP Application No. 18745774.2, dated Dec. 7, 2021, 7 pages.

* cited by examiner

Client Device 220

SYSTEMS AND METHODS OF POWER-MANAGEMENT ON SMART DEVICES

RELATED APPLICATIONS

This application is a continuation of PCT Patent Application No. PCT/US2018/040781, filed Jul. 3, 2018, which claims priority to U.S. Provisional Application No. 62/663,149, filed Apr. 26, 2018, each of which is hereby incorporated by reference in its entirety.

TECHNICAL FIELD

This relates generally to camera devices, including but not limited to, characterizing motion to manage power on camera devices.

BACKGROUND

Home entryways are sensitive areas often associated with the security and peace of mind of the home's occupants. Home owners and occupants have an interest in monitoring their entryways for security and convenience. Some existing surveillance systems detect persons in the field of view of a security camera, and some initiate a general alert upon such detection. However, a single type of alert is not appropriate for all detected persons; some persons may be welcome guests, occupants, unwelcome visitors, or merely persons passing by the entryway.

In addition, video doorbells and standalone cameras that operate from batteries pose a significant power optimization problem as compared to line-powered cameras. For example, the form factor of such devices generally prohibits the use of large-capacity batteries.

It is a challenge to accurately identify, categorize, and respond to visitors to a home. Human-friendly techniques for discovering, categorizing, and responding to visitors, while reducing the energy usage, are in great need.

SUMMARY

Accordingly, there is a need for systems and/or devices with more efficient, accurate, and intuitive methods for entity (e.g., person) and event identification, categorization, and presentation. Such systems, devices, and methods optionally complement or replace conventional systems, devices, and methods for entity and event identification, categorization, and/or presentation.

Users of home monitoring systems can potentially be bombarded with alerts and notifications about unimportant and trivial events if the systems do not employ some recognition/identification and categorization processes. Triggering such alerts generally requires utilization of wireless network(s), which can be a significant drain on a battery-powered device. Moreover, the large number of unnecessary or incomplete information places a larger burden on the users and makes it more difficult to identify and respond to important events.

For example, a user who receives video notifications every time a person walks in front of a battery-powered camera mounted at an entryway of the home may not be able to quickly and efficiently distinguish between passersby and visitors. Moreover, the battery-powered camera consumes significant power in transmitting the video notifications. Thus, it is beneficial to be able to recognize when a detection event is of interest to the user (e.g., is caused by a visitor approaching the entryway).

For example, rather than sending a video notification any time motion is detected. A battery-powered camera could classify the motion and send a text notification that the mailman has delivered the mail and a video notification when an unknown person is lingering on the property. In this way, the user can see at a glance the nature of the event and the camera conserves energy by not sending unnecessary video data for trivial or expected events.

In some implementations, there are three stages of operation for a video doorbell. Each stage requires energy and a superposition of these stages can be used to calculate total power needed to operate the doorbell. The baseline stage is the idle stage of operation. This stage assumes the lowest power while still providing a minimal amount of functionality. Added to the baseline power is the active power of the camera. This stage includes the additional function of capturing and storing the video image. Finally, the transmit stage includes the transmission of video data over a local network.

In some implementations where the video data is transmitted via Wi-Fi, the transmit stage uses the most energy. To minimize energy usage, three modes of operation are used to transmit video data.

Mode 1. A capture, store, and send snapshot mode—In this mode, a motion event triggers capture and store of a video clip on the camera device (without automatic transmission to a remote server or client device). In some implementations, the event generates a notification, e.g., a text-only notification or a notification having a snapshot (or animation of snapshots) of the motion event for the user. Once the user receives the notification, the user can decide whether to request and review the additional video data for the motion event stored at the camera device. In some implementations, the stored clips are overwritten depending on storage or time limitations if they are not saved by the user.

Mode 2. An on-demand video mode—In this mode, the user has a preference for real-time (immediate) transmission of video data. For example, the video stream is automatically transmitted for particular types of events (e.g., a visitor activating the doorbell). The automatic streaming allows for low latency to first image when the user responds to the event (e.g., interacts with the visitor via the doorbell). In another example, the user initiates an on-demand transmission to check status at the door (e.g., delivery of a package). In this example, the transmission incurs an added latency and does not contain roll-back video before the request was initiated since no prior event triggered the capture.

Mode 3. A review mode—In this mode, if, at a later time, the user wants to review a stored clip, they are enabled to browse snapshots and select the snapshot event of interest to playback the full video clip. The video clip stored at the camera is then sent to the user.

Thus, the amount of power used for video transmit is limited by selectively transmitting only those real-time images the user prioritizes as important. The user selectively decides which events should trigger automatic transmission and which events can be requested from a historical archive at the camera device.

In one aspect, some implementations include a method performed at a camera device having memory, one or more processors, and an image sensor. The method includes: (1) while a wireless communication component of the camera device is deactivated: (a) capturing, with the image sensor, a plurality of images containing a motion event; (b) characterizing the motion event; and (c) determining, based on the characterization of the motion event, whether to send video data to a remote computing system; and (2) in accordance with a determination to send video data to the remote computing system: (a) activating the wireless communication component of the camera device; (b) establishing a wireless connection to the remote computing system via the wireless communication component; and (c) sending video information to the remote computing system via the established wireless connection. In some implementations, the motion event is characterized based on a segment of video data (e.g., 2, 5, or 10 second segment). In some implementations, the remote computing system is a cloud server, e.g., a cloud server configured to manage multiple smart home accounts and relay camera information to one or more user devices. In some implementations, the remote computing system is a client device, e.g., the camera device is configured to send the video information directly to the client device.

In another aspect, some implementations include a camera device having one or more processors, an image sensor, and memory storing one or more instructions that, when executed by the one or more processors, cause the camera device to perform operations including: (1) while a wireless communication component of the camera device is deactivated: (a) capturing, with the image sensor, a plurality of images containing a motion event; (b) characterizing the motion event; and (c) determining, based on the characterization of the motion event, whether to send video data to a remote computing system; and (2) in accordance with a determination to send video data to the remote computing system: (a) activating the wireless communication component of the camera device; (b) establishing a wireless connection to the remote computing system via the wireless communication component; and (c) sending video information to the remote computing system via the established wireless connection. In some implementations, the camera device is configured to perform any of the methods described herein.

In another aspect, some implementations include a non-transitory computer-readable storage medium storing one or more programs, the one or more programs comprising instructions which, when executed by a camera device with one or more processors, memory, and an image sensor, cause the camera device to perform operations including: (1) while a wireless communication component of the camera device is deactivated: (a) capturing, with the image sensor, a plurality of images containing a motion event; (b) characterizing the motion event; and (c) determining, based on the characterization of the motion event, whether to send video data to a remote computing system; and (2) in accordance with a determination to send video data to the remote computing system: (a) activating the wireless communication component of the camera device; (b) establishing a wireless connection to the remote computing system via the wireless communication component; and (c) sending video information to the remote computing system via the established wireless connection. In some implementations, the non-transitory computer-readable storage medium includes instructions to perform any of the methods described herein.

Thus, devices are provided with more efficient and effective methods for monitoring and facilitating review of events and persons in video streams, thereby increasing the accuracy, effectiveness, efficiency, and user satisfaction with such devices, while reducing power consumption and extending battery life. Such devices and methods may complement or replace conventional systems and methods for event and person monitoring, presentation, response, and interaction.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DETAILED DESCRIPTION

Due to the potentially large amount of trivial and uninteresting motion events detected by a home monitoring system, it is beneficial to employ recognition/identification and categorization to limit a number of notifications or alerts sent to the users. Such limitations preserve energy of the smart devices and prevents the users from receiving large amount of unwanted notifications, potentially making it more difficult for the user to identify important events.

For example, rather than notifying a user every time a person walks in front of a camera mounted at an entryway of the home, it is beneficial to be able to recognize whether the motion event is caused by a visitor approaching the entryway or by a mere passerby, and determine whether to (i) send video data of the event to the user, (ii) store the video data for later retrieval, or (iii) disregard the event. In this example, the camera device sends text, still images, animated images, or video clips based on the classification of the event. This enables the camera device to conserve energy and the user to more quickly and efficiently make a determination as to whether the event requires any action or further review by the user. Further, the user can see at a glance the nature of the event and request more details (e.g., a clip of the event) and/or generate a response (e.g., alert the authorities, or initiate a communication).

Accordingly, some implementations include a battery-powered camera device that recognizes contextual information related to detected visitors. In some implementations, when a visitor presses a doorbell (or knocks or makes a verbal announcement), the camera device sends an indication to the user's device (also sometimes referred to herein as a client device) that there was a visitor announcement (e.g., a doorbell button press or a knock), and the user's device displays an alert (or other type of notification). In some implementations, the alert includes a video clip (e.g., a gif) or a static image of the visitor. In some implementations, if the camera device senses a motion event involving an approaching visitor, and the visitor does not make an announcement (e.g., does not press the doorbell or knock on the door) within a threshold amount of time, the camera device sends a notification to the user's device that there is a visitor that has not yet made an announcement (sometimes referred to herein as an unannounced visitor). In some implementations, the notifications are sent directly to the users' device(s), while in other implementations, the notifications are sent to a server system (e.g., a cloud server) that relays the notifications to the users' device(s).

Figure 1:
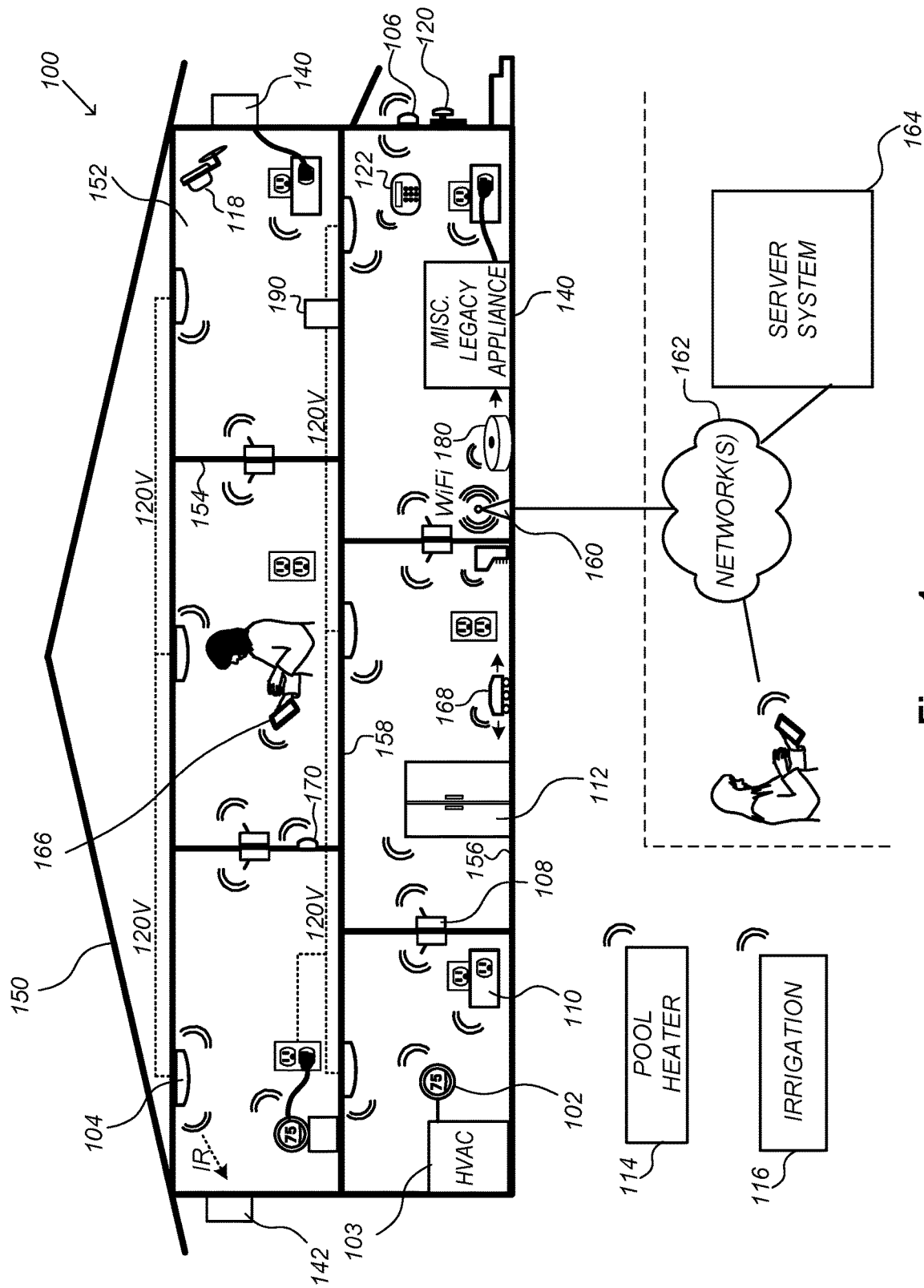
FIG. 1 is an example smart home environment in accordance with some implementations.

Turning now to the figures, FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2A) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding black-body radiation data as output.

The smart doorbell 106 and/or the smart door lock 120 detects a person's approach to or departure from a location (e.g., an outer door), control doorbell/door locking functionality (e.g., receive user inputs from a portable electronic device 166 to actuate bolt of the smart door lock 120), announce a person's approach or departure via audio or visual means, and/or control settings on a security system (e.g., to activate or deactivate the security system when occupants go and come). In some implementations, the smart doorbell 106 and/or the smart lock 120 are battery-powered (e.g., are not line-powered). In some implementations, the smart doorbell 106 includes some or all of the components and features of the camera 118. In some implementations, the smart doorbell 106 includes a camera 118. In some implementations, the smart doorbell 106 includes a camera 118 that is embedded in the doorbell 106. In some implementations, the smart doorbell 106 includes a camera that is mounted on or near the doorbell 106. In some implementations, the smart doorbell 106 includes a camera 118 that is not mounted in, on, or near the doorbell 106, but is instead mounted in proximity to the doorbell 106. In some implementations, the smart doorbell 106 includes two or more cameras 118 (e.g., one camera facing the entryway, and another camera facing approaching visitors). In some implementations, the smart doorbell 106 has a camera (also sometimes referred to herein as doorbell camera 106) which is separate from a video camera 118. For the purposes of this disclosure, video-related references to doorbell 106 refer to one or more cameras associated with doorbell 106.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 detect ambient lighting conditions, detect room-occupancy states, and/or control a power and/or dim state of one or more lights. In some instances, smart wall switches 108 also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. In some implementations, the cameras 118 are battery-powered (e.g., are not line-powered). In some implementations, as described in more detail below, the cameras 118 are configured to selectively couple to one or more networks and/or selectively capture, store, transmit video data (e.g., based on presence and characterization of motion within the field of view). In some implementations, in the low power mode, a camera 118 detects an approaching visitor using a low power sensor, such as a PIR sensor, which is always on or periodically on.

In some implementations, the cameras 118 are used to determine occupancy of the structure 150 and/or particular rooms 152 in the structure 150, and thus act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

In some implementations, the smart home environment 100 includes one or more network-connected doorbells 106 that are configured to provide video monitoring and security in a vicinity of an entryway of the smart home environment 100. The doorbells 106 are optionally used to determine the approach and/or presence of a visitor. Specific individuals are optionally identified based, for example, on their appearance (e.g., height, face) and/or movement (e.g., their walk/gait). A doorbell 106 optionally includes one or more sensors (e.g., IR sensors, motion detectors), input devices (e.g., microphone for capturing audio), and output devices (e.g., speaker for outputting audio). In some implementations, a doorbell 106 is configured to operate in a high-light mode (e.g., a day mode) and in a low-light mode (e.g., a night mode). In some implementations, a doorbell 106 includes one or more IR illuminators for providing illumination while the camera is operating in the low-light mode. In some implementations, a doorbell 106 includes one or more lights (e.g., one or more LEDs) for illuminating the doorbell in low-light conditions and/or giving visual feedback to a visitor. In some implementations, a doorbell 106 includes additional features and/or components such as weatherproofing and/or solar ray compensation. In some implementations, doorbell 106 is battery powered and runs in a low power or a high power mode. In some implementations, in the low power mode, doorbell 106 detects an approaching visitor using a low power sensor such as a PIR sensor which is always on or periodically on. In some implementations, after the visitor approach is detected, doorbell 106 switches to the high power mode to carry out further processing functions (described below).

In some implementations, the smart home environment 100 additionally or alternatively includes one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, the smart home environment 100 includes one or more devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, the devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., a camera included with doorbell 106), metadata output by a smart device, settings information for a smart device, usage logs for a smart device, and the like. In some implementations, local storage device 190 is communicatively coupled to one or more smart devices via a smart home network (e.g., smart home network 202, FIG. 2A). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of the camera included with doorbell 106 exceeds the available bandwidth of the external network (e.g., network(s) 162). In some implementations, local storage device 190 temporarily stores video data from one or more doorbells (e.g., doorbell 106) prior to transferring the video data to a server system (e.g., server system 164).

Figure 2A:
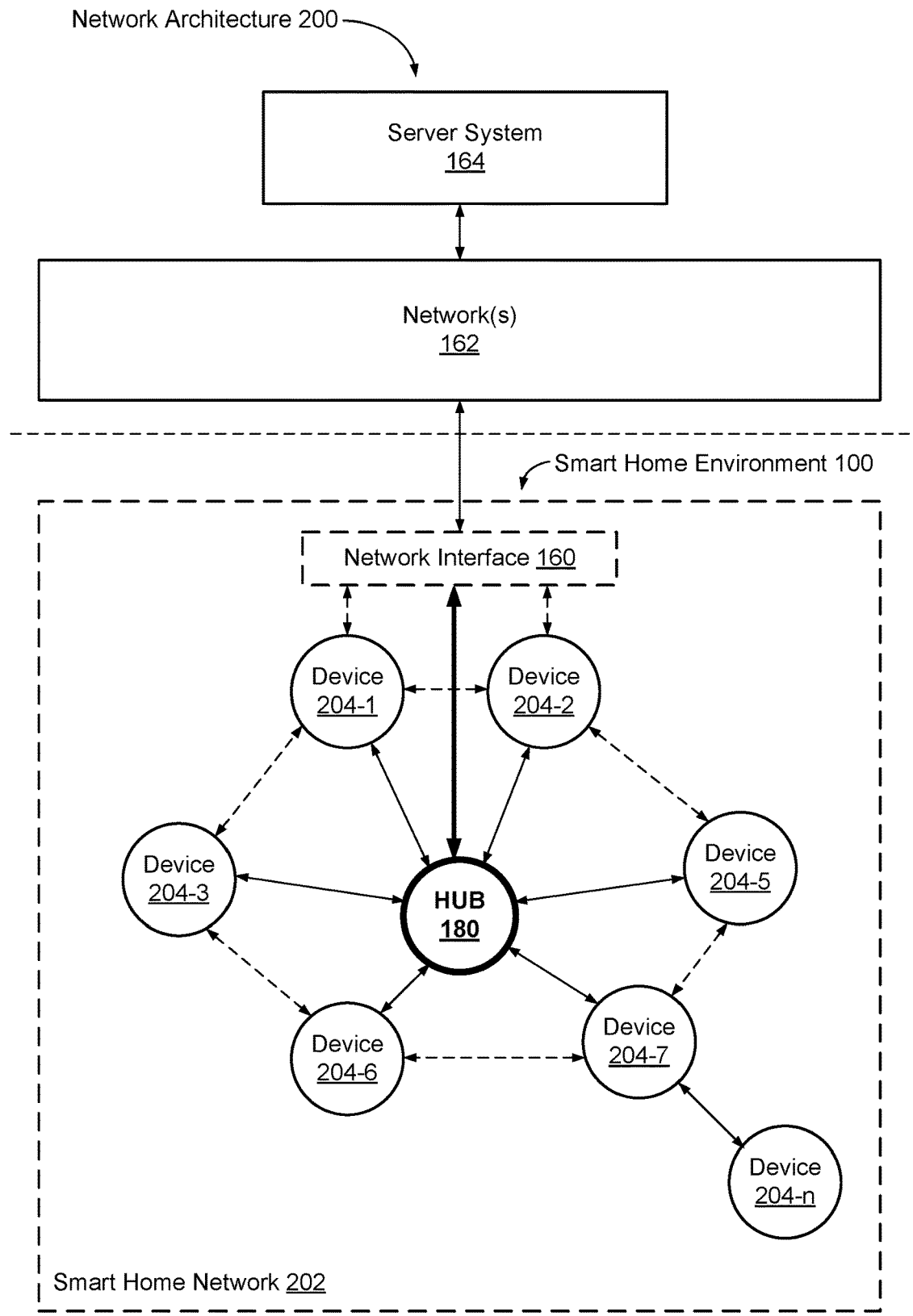
FIG. 2A is a block diagram illustrating a representative network architecture that includes a smart home network in accordance with some implementations.

FIG. 2A is a block diagram illustrating a representative network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, the hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the server system 164.

Other examples of low-power nodes include battery-powered versions of the smart hazard detectors 104, cameras 118, doorbells 106, and the like. These battery-powered smart devices are often located in an area without access to constant and reliable power and optionally include any number and type of sensors, such as image sensor(s), occupancy/motion sensors, ambient light sensors, ambient temperature sensors, humidity sensors, smoke/fire/heat sensors (e.g., thermal radiation sensors), carbon monoxide/dioxide sensors, and the like. Furthermore, battery-powered smart devices may send messages that correspond to each of the respective sensors to the other devices and/or the server system 164, such as by using the mesh network as described above.

Examples of spokesman nodes include line-powered smart doorbells 106, smart thermostats 102, smart wall switches 108, and smart wall plugs 110. These devices are located near, and connected to, a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
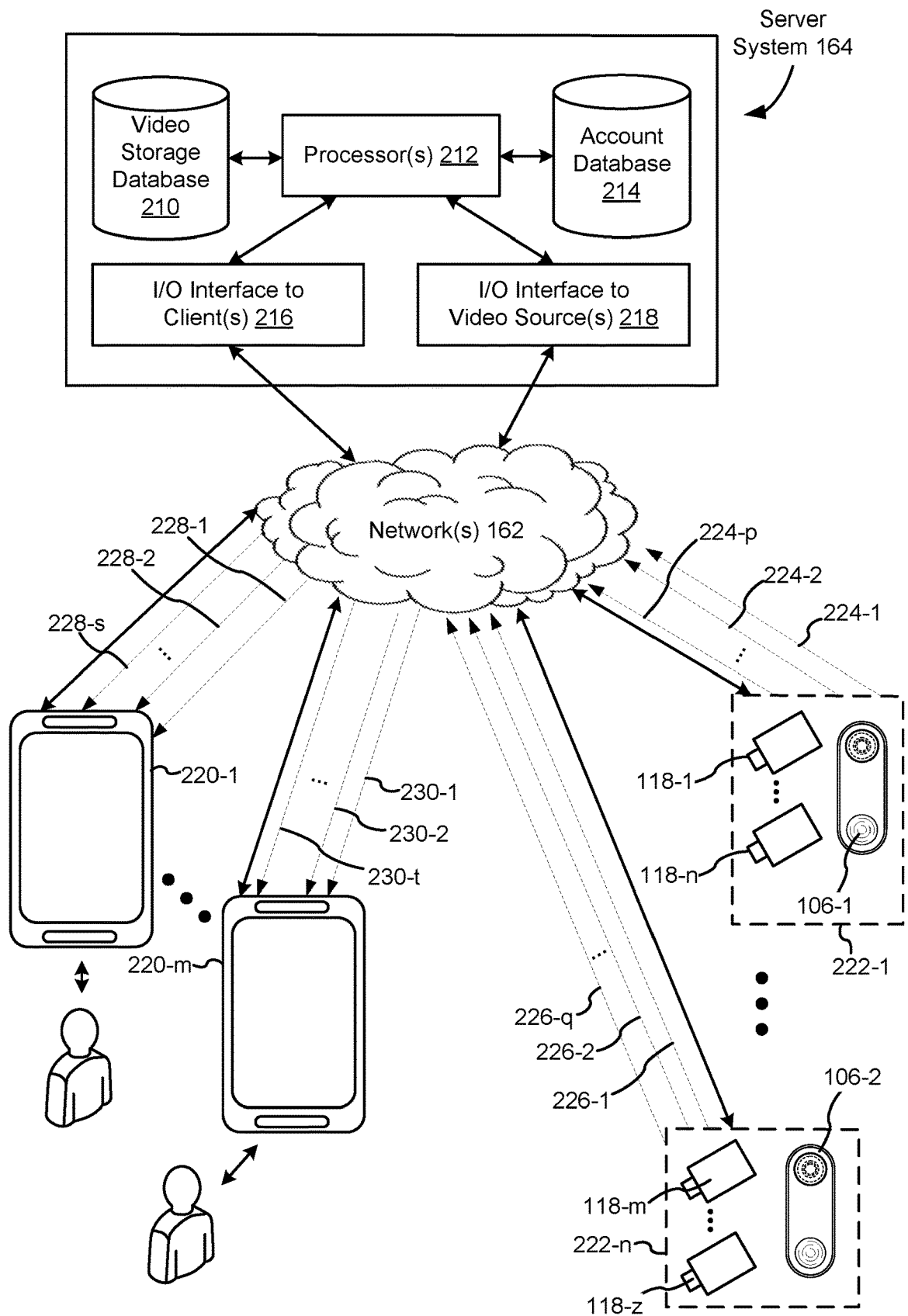
FIG. 2B is a representative operating environment in which a server system interacts with client devices and smart devices in accordance with some implementations.

FIG. 2B illustrates a representative operating environment in which a server system 164 provides data processing for monitoring and facilitating review of events (e.g., motion, audio, security, etc.) from data captured by the smart devices 204, such as video cameras 118 or doorbell cameras 106. As shown in FIG. 2B, the server system 164 receives data from video sources 222 (including cameras 118 and/or doorbell cameras 106) located at various physical locations (e.g., inside or in proximity to homes, restaurants, stores, streets, parking lots, and/or the smart home environments 100 of FIG. 1). In some implementations, the video source(s) 222 are linked to more than one reviewer account (e.g., multiple user accounts may be subscribed to a single smart home environment). In some implementations, the server system 164 provides video monitoring data for the video source 222 to client devices 220 associated with the reviewer accounts. For example, the portable electronic device 166 is an example of the client device 220. In some implementations, the server system 164 comprises a video processing server that provides video processing services to the video sources and client devices 220. In some implementations, the server system 164 receives non-video data from one or more smart devices 204 (e.g., audio data, metadata, numerical data, etc.). In some implementations, the non-video data is analyzed to provide context for motion events detected by the video cameras 118 and/or doorbell cameras 106. In some implementations, the non-video data indicates that an audio event (e.g., detected by an audio device), security event (e.g., detected by a perimeter monitoring device), hazard event (e.g., detected by a hazard detector), medical event (e.g., detected by a health-monitoring device), or the like has occurred within a smart home environment 100.

In some implementations, a multiple reviewer accounts are linked to a single smart home environment 100. For example, multiple occupants of a smart home environment 100 may have accounts liked to the smart home environment. In some implementations, each reviewer account is associated with a particular level of access. In some implementations, each reviewer account has personalized notification settings. In some implementations, a single reviewer account is linked to multiple smart home environments 100. For example, a person may own or occupy, or be assigned to review and/or govern, multiple smart home environments 100. In some implementations, the reviewer account has distinct levels of access and/or notification settings for each smart home environment.

In some implementations, each of the video sources 222 includes one or more video cameras 118 or doorbell cameras 106 that capture video and send the captured video to the server system 164 substantially in real-time. In some implementations, each of the video sources 222 includes one or more doorbell cameras 106 that capture video and send the captured video to the server system 164 in real-time (e.g., within 1 second, 10 seconds, 30 seconds, or 1 minute). In some implementations, each of the doorbells 106 include a video camera that captures video and sends the captured video to the server system 164 in real-time. In some implementations, a video source 222 includes a controller device (not shown) that serves as an intermediary between the one or more doorbells 106 and the server system 164. The controller device receives the video data from the one or more doorbells 106, optionally performs some preliminary processing on the video data, and sends the video data and/or the results of the preliminary processing to the server system 164 on behalf of the one or more doorbells 106 (e.g., in real-time). In some implementations, each camera has its own on-board processing capabilities to perform some preliminary processing on the captured video data before sending the video data (e.g., along with metadata obtained through the preliminary processing) to the controller device and/or the server system 164. In some implementations, one or more of the cameras is configured to optionally locally store the video data (e.g., for later transmission if requested by a user). In some implementations, a camera is configured to perform some processing of the captured video data, and, based on the processing, either send the video data in substantially real-time, store the video data locally, or disregard the video data.

Figure 6:
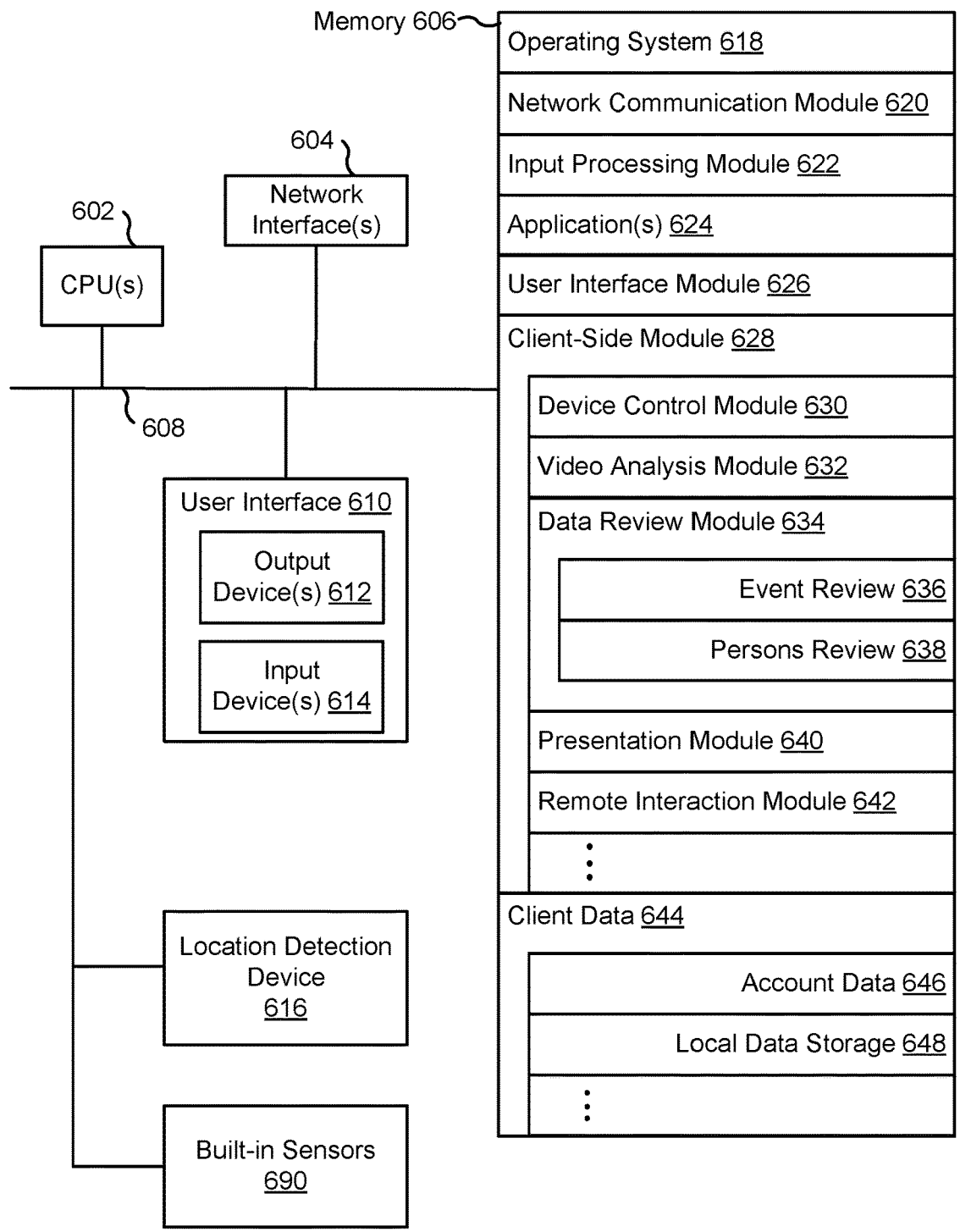
FIG. 6 is a block diagram illustrating a representative client device in accordance with some implementations.

In accordance with some implementations, a client device 220 includes a client-side module or smart home application, such as client-side module 628 in FIG. 6. In some implementations, the client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. In some implementations, the server-side module also provides server-side functionality for video processing and camera control for any number of the video sources 222, including any number of control devices, cameras 118, and doorbells 106.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more doorbells 106, cameras 118, and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a cloud server, a distributed cloud computing system, a handheld computer, a tablet computer, a laptop computer, a desktop computer, or a combination of any two or more of these data processing devices or other data processing devices.

In some implementations, a server-client environment includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects may be performed by the server system 164, a client device 220, and a video source 222 cooperatively.

In some implementations, a video source 222 (e.g., a camera 118 or doorbell 106 having an image sensor) transmits one or more streams of video data to the server system 164. In some implementations, the one or more streams include multiple streams, of respective resolutions and/or frame rates, of the raw video captured by the image sensor. In some implementations, the multiple streams include a "primary" stream (e.g., 226-1) with a certain resolution and frame rate (e.g., corresponding to the raw video captured by the image sensor), and one or more additional streams (e.g., 226-2 through 226-$q$). An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream. In some implementations, the primary stream and/or the additional streams are dynamically encoded (e.g., based on network conditions, server operating conditions, camera operating conditions, characterization of data in the stream (e.g., whether motion is present), user preferences, and the like.

In some implementations, one or more of the streams 226 is sent from the video source 222 directly to a client device 220 (e.g., without being routed to, or processed by, the server system 164). In some implementations, one or more of the streams is stored at the doorbell 106 (e.g., in memory 406, FIG. 4) and/or a local storage device 190 (e.g., a dedicated recording device), such as a digital video recorder (DVR). For example, in accordance with some implementations, the doorbell 106 stores the most recent 24 hours of video footage recorded by the camera. As another example, in accordance with some implementations, the doorbell 106 stores up to 24 hours of video footage recorded by the camera (e.g., up to 24 hours of motion event data). In some implementations, portions of the one or more streams are stored at the doorbell 106 and/or the local storage device 109 (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream.

Figure 3A:
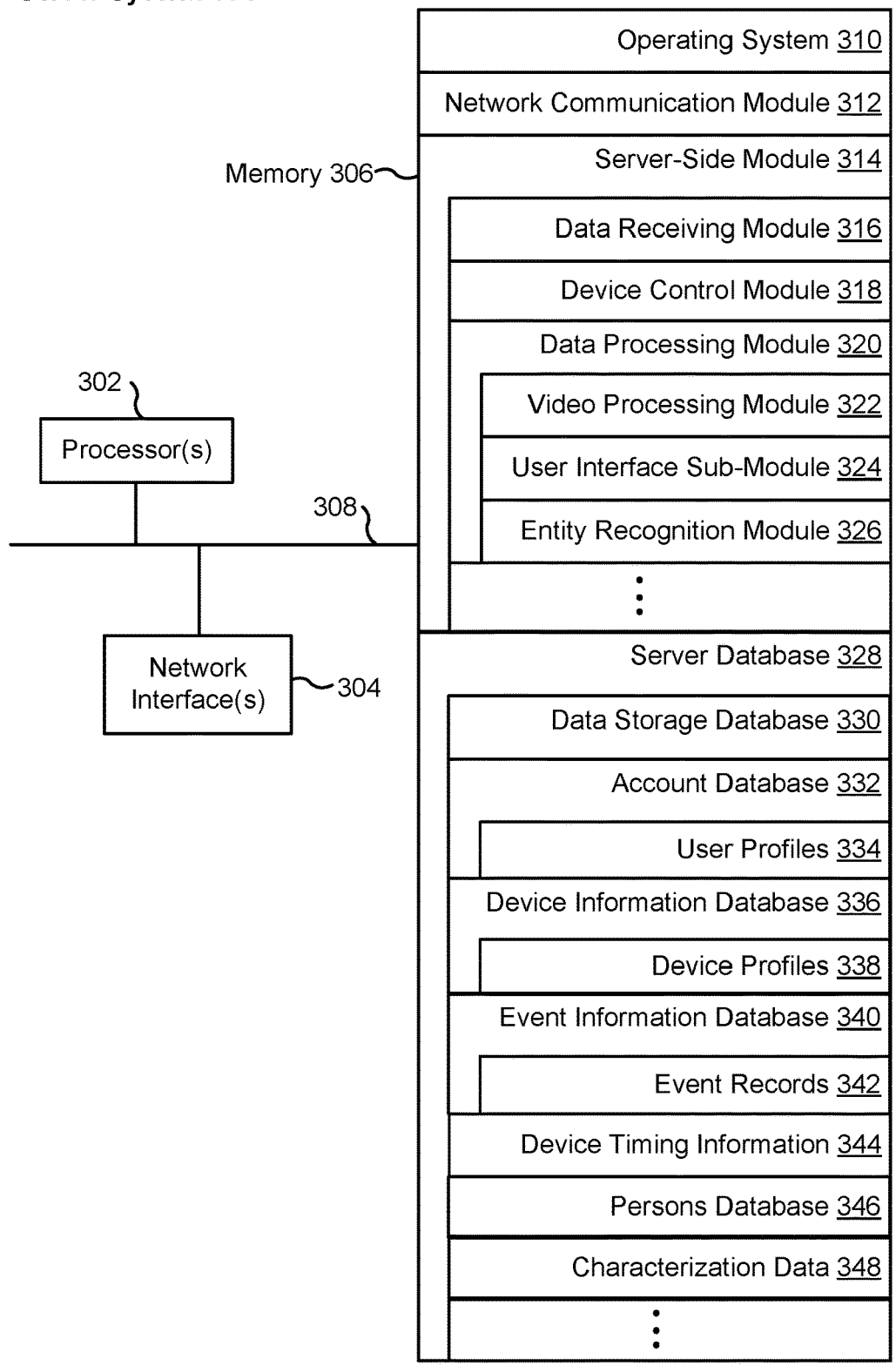
FIG. 3A is a block diagram illustrating a representative server system in accordance with some implementations.

FIG. 3A is a block diagram illustrating the server system 164 in accordance with some implementations. The server system 164 includes one or more processing units (CPUs) 302, one or more network interfaces 304 (e.g., including an I/O interface to one or more client devices and an I/O interface to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. The memory 306, or alternatively the non-volatile memory within memory 306, includes a non-transitory computer-readable storage medium. In some implementations, the memory 306, or the non-transitory computer-readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 164 to other systems and devices (e.g., client devices, electronic devices, and systems connected to one or more networks 162) via one or more network interfaces 304 (wired or wireless);
- a server-side module 314, which provides server-side functionalities for device control, data processing, and data review, including, but not limited to:
  - a data receiving module 316 for receiving data from electronic devices (e.g., video data from a doorbell 106, FIG. 1), and preparing the received data for further processing and storage in the data storage database 316O;
  - a device control module 318 for generating and sending server-initiated control commands to modify operation modes of electronic devices (e.g., devices of a smart home environment 100), and/or receiving (e.g., from client devices 220) and forwarding user-initiated control commands to modify operation modes of the electronic devices;
  - a data processing module 320 for processing the data provided by the electronic devices, and/or preparing and sending processed data to a device for review (e.g., client devices 220 for review by a user), including, but not limited to:
    - a video processor sub-module 322 for processing (e.g., categorizing and/or recognizing) detected entities and/or event candidates within a received video stream (e.g., a video stream from doorbell 106);
    - a user interface sub-module 324 for communicating with a user (e.g., sending alerts, timeline events, etc. and receiving user edits and zone definitions and the like); and
    - an entity recognition module 326 for analyzing and/or identifying persons detected within smart home environments; and
- a server database 328, including but not limited to:
  - a data storage database 330 for storing data associated with each electronic device (e.g., each doorbell) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;
  - an account database 332 for storing account information for user accounts, including user account information such as user profiles 334, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
  - a device information database 336 for storing device information related to one or more devices such as device profiles 338, e.g., device identifiers and hub device specific secrets, independently of whether the corresponding hub devices have been associated with any user account;
  - an event information database 340 for storing event information such as event records 342 and context information, e.g., contextual data describing circumstances surrounding an approaching visitor;
  - a persons database 346 for storing information regarding detected and/or recognized persons, such as images (e.g., cropped headshots) of detected persons and feature characterization data for the persons; and
  - characterization data 348 for use with characterizing motion, persons, and events within the smart home environment, e.g., in conjunction with data processing module 320.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above.

Furthermore, the memory 306, optionally, stores additional modules and data structures not described above (e.g., an account management module for linking client devices, smart devices, and smart home environments).

Figure 3B:
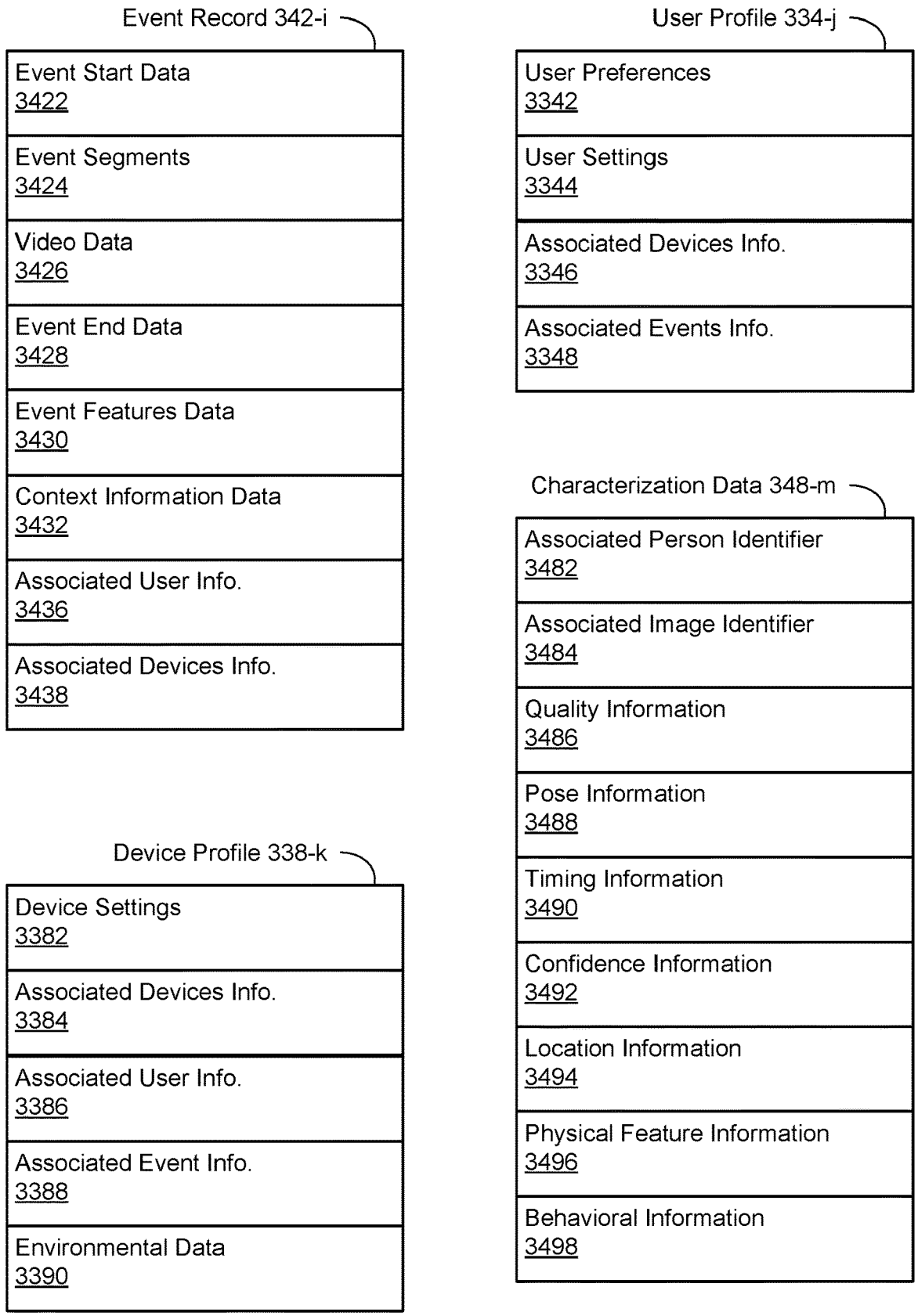
FIG. 3B illustrates various data structures used in some implementations.

FIG. 3B illustrates various data structures used by some implementations, including an event record 342-i, a user profile 334-j, a device profile 338-k, and characterization data 348-m. The event record 342-i corresponds to an event T and data for the event T. In some implementations, the event T includes one or more of: a motion event, a hazard event, a medical event, a power event, an audio event, and a security event. In some instances, the data for a motion event T includes event start data 3422 indicating when and/or how the event started, event segments data 3424, video data 3426, event end data 3428 indicating when and/or how the event ended, event features data 3430, context information data 3432, associated user information 3436 (e.g., user participating in the event and/or users associated with the smart home environment in which the event took place), and associated devices information 3438. In some instances, the event record 342-i includes only a subset of the above data. In some instances, the event record 342-i includes additional event data not shown such as data regarding event/motion masks.

The event start data 3422 includes date and time information such as a timestamp and optionally includes additional information such as information regarding the amount of motion present, a motion start location, amount of audio present, characteristics of the audio, and the like. Similarly, the event end data 3428 includes date and time information such as a timestamp and optionally includes additional information such as information regarding the amount of motion present, a motion start location, amount of audio present, characteristics of the audio, and the like.

The event segments 3424 includes information regarding segmentation of the motion event T. In some instances, event segments are stored separately from the video data 3426. In some instances, the event segments are stored at a different (lower) display resolution than the video data. For example, the event segments are optionally stored at 480p or 780p and the video data is stored at 1080i or 1080p. Storing the event segments at a lower display resolution enables the system to devote less time and resources to retrieving and processing the event segments. In some instances, the event segments are not stored separately and the segmentation information includes references to the video data 3426 as well as date and time information for reproducing the event segments. In some implementations, the event segments include one or more audio segments (e.g., corresponding to video segments).

The event features data 3430 includes information regarding event features such as event categorizations/classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like.

The context information data 3432 includes context information regarding the event such as information regarding the visitor (e.g., behavior, clothing, or size characteristics), information regarding approach timing (e.g., time of day, level of brightness), information regarding visitor announcements (e.g., doorbell press, knocking, and associated timing thereof), information regarding scheduling (e.g., proximity in time to a prescheduled event, or proximity in time to a prescheduled status of the smart home environment), information regarding the status or location of one or more users, and the like.

The associated user information 3436 includes information regarding users associated with the event such as users identified in the event, users receiving notification of the event, and the like. In some instances, the associated user information 3436 includes a link, pointer, or reference to a user profile 334 for to the user. The associated devices information 3438 includes information regarding the device or devices involved in the event (e.g., a doorbell 106 that recorded the event). In some instances, the associated devices information 3438 includes a link, pointer, or reference to a device profile 338 for the device.

The user profile 334-j corresponds to a user 'j' associated with the smart home network (e.g., smart home network 202) such as a user of a smart device 204, a user identified by a smart device 204, a user who receives notifications from a smart device 204 or from the server system 164, and the like. In some instances, the user profile 334-j includes user preferences 3342, user settings 3344, associated devices information 3346, and associated events information 3348. In some instances, the user profile 334-j includes only a subset of the above data. In some instances, the user profile 334-j includes additional user information not shown, such as information regarding other users associated with the user T and/or information regarding smart home environments linked to the user.

The user preferences 3342 include explicit user preferences input by the user as well as implicit and/or inferred user preferences determined by the system (e.g., server system 164 and/or client device 220). In some instances, the inferred user preferences are based on historical user activity and/or historical activity of other users. The user settings 3344 include information regarding settings set by the user T such as notification settings, device settings, and the like. In some instances, the user settings 3344 include device settings for devices associated with the user 'j'.

The associated devices information 3346 includes information regarding devices associated with the user 'j' such as devices within the user's smart home environment(s) 100 and/or client device(s) 220. In some instances, associated devices information 3346 includes a link, pointer, or reference to a corresponding device profile 338. Associated events information 3348 includes information regarding events associated with user 'j' such as events in which user 'j' was identified, events for which user 'j' was notified, events corresponding to a smart home environment 100 of user T, and the like. In some instances, the associated events information 3348 includes a link, pointer, or reference to a corresponding event record 342.

The device profile 338-k corresponds to a device 'k' associated with a smart home network (e.g., smart home network 202) such as a camera device 118, a doorbell 106, a client device 220, and the like. In some instances, the device profile 338-k includes device settings 3382, associated devices information 3384, associated user information 3386, associated event information 3388, and environmental data 3390. In some instances, the device profile 338-k includes only a subset of the above data. In some instances, the device profile 338-k includes additional device information not shown such as information regarding a current state of the device 'k'.

The device settings 3382 include information regarding the current settings of device 'k' such as positioning information, mode of operation information, and the like. In some implementations and instances, the device settings 3382 are user-specific and are set by respective users of the device 'k'. The associated devices information 3384 includes information regarding other devices associated with device 'k' such as other devices linked to device 'k' and/or other devices in the same smart home network as device 'k'. In some instances, the associated devices information 3384 includes a link, pointer, or reference to a respective device profile 338 of the associated device.

The associated user information 3386 includes information regarding users associated with the device such as users receiving notifications from the device, users registered with the device, users associated with the smart home network of the device, and the like. In some instances, the associated user information 3386 includes a link, pointer, or reference to a user profile 334 corresponding to the associated user.

The associated event information 3388 includes information regarding events associated with the device 'k' such as historical events involving the device 'k' or captured by the device 'k'. In some instances, the associated event information 3388 includes a link, pointer, or reference to an event record 342 corresponding to the associated event.

The environmental data 3390 includes information regarding the environment of device 'k' such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

The characterization data 348-$m$ corresponds to an event 'm' detected by within the smart home environment 100. As shown in FIG. 3B, in accordance with some implementations, the characterization data 348 includes an associated person identifier 3384, an associated image identifier 3484, quality information 3486, pose information 3488, timing information 3490, confidence information 3492, location information 3494, physical feature information 3496, and behavioral information 3498. In some implementations, the characterization data 348 includes additional data not shown, such as the smart devices or sensors that detected the event. In some implementations, the characterization data 348 includes only a subset of the data shown.

The associated person identifier 3482 includes a label or other identifier for each person represented by the characterization data. In some implementations, a label is applied by a user upon review of the corresponding image. In some implementations, the identifier 3482 is assigned by the system in accordance with a determination that the characterization data 348 matches, or is similar to, other characterization data associated with the identifier.

The associated image identifier 3484 identifies one or more images from which the characterization data 348 was generated. In some implementations, there is a one-to-one mapping between the characterization data and the images, while in some other implementations, there is a many-to-one or one-to-many mapping. In some implementations, the associated image identifier 3484 includes a pointer or logical storage address for the one or more images.

The quality information 3486 includes a quality factor for the characterization data 348. In some implementations, the quality factor is based on one or more of: a blurriness of the image, a resolution of the image, an amount of the person that is visible in the image, how many features of the person are visible in the image, and a distance between the person and the camera that captured the image.

The pose information 3488 identifies a pose of each detected person. In some implementations, the pose information 3488 includes information regarding an angle between the camera that captured the image and the detected person. In some implementations, the pose information 3488 includes information regarding a portion of the person's face that is visible in the image.

The timing information 3490 includes information regarding when the image was captured by the camera. In some implementations, the timing information 3490 indicates the time of day, the day, the month, the year, etc. that the image was captured. In some implementations, the characterization data 348 includes operating information for the camera indicating the mode of operation and settings of the camera (e.g., indicating whether the camera was in a low-light mode when the image was captured). In some implementations, the timing information 3490 is used in conjunction with a device profile 338 for the camera to determine operating information for the camera at the time the image was captured.

The confidence information 3492 indicates a confidence that the associated person identifier(s) 3482 are accurate. In some implementations, the confidence information 3492 is based on a similarity between the characterization data 348 and other characterization data for the associated person(s). In some implementations, the confidence information 3492 includes a confidence score for the characterization data 348. In some implementations, in accordance with a determination that the confidence score is below a predetermined threshold, the association to the person(s) is reevaluated and/or the characterization data 348 and associated image is flagged as potentially having an incorrect associated person identifier 3482. In some implementations, flagged characterization data 348 is presented to a user for confirmation or reclassification.

The location information 3494 includes information regarding a location for the image and/or the detected person. In some implementations, the location information 3494 indicates a location for the camera that captured the image. In some implementations, the location information 3494 identifies the camera that captured the image. In some implementations, the location information 3494 indicates a room or portion of the smart home environment that was captured in the image. In some implementations, the location information 3494 indicates a GPS or coordinates-based location for the image.

The physical feature information 3496 includes information regarding the physical features of the detected person(s). In some implementations, the physical feature information 3496 includes characterization of the person's physical features (e.g., nose, ears, eyes, and hair). In some implementations, the physical feature information 3496 includes information regarding the person's speech, gait, and/or posture. In some implementations, the physical feature information 3496 includes information regarding the person's dimensions, such as the distance between the person's eyes or ears, or the length of the person's arms or legs. In some implementations, the physical feature information 3496 includes information regarding of the person's age, gender, and/or ethnicity. In some implementations, the physical feature information 3496 includes information regarding the person's clothing and/or accessories (e.g., whether the person is wearing a hat, glass, gloves, and/or rings).

The behavioral information 3498 includes information regarding the behavior of the detected person. In some implementations, the behavioral information 3498 includes information regarding the detected person's mood and/or mannerisms.

Figure 4A:
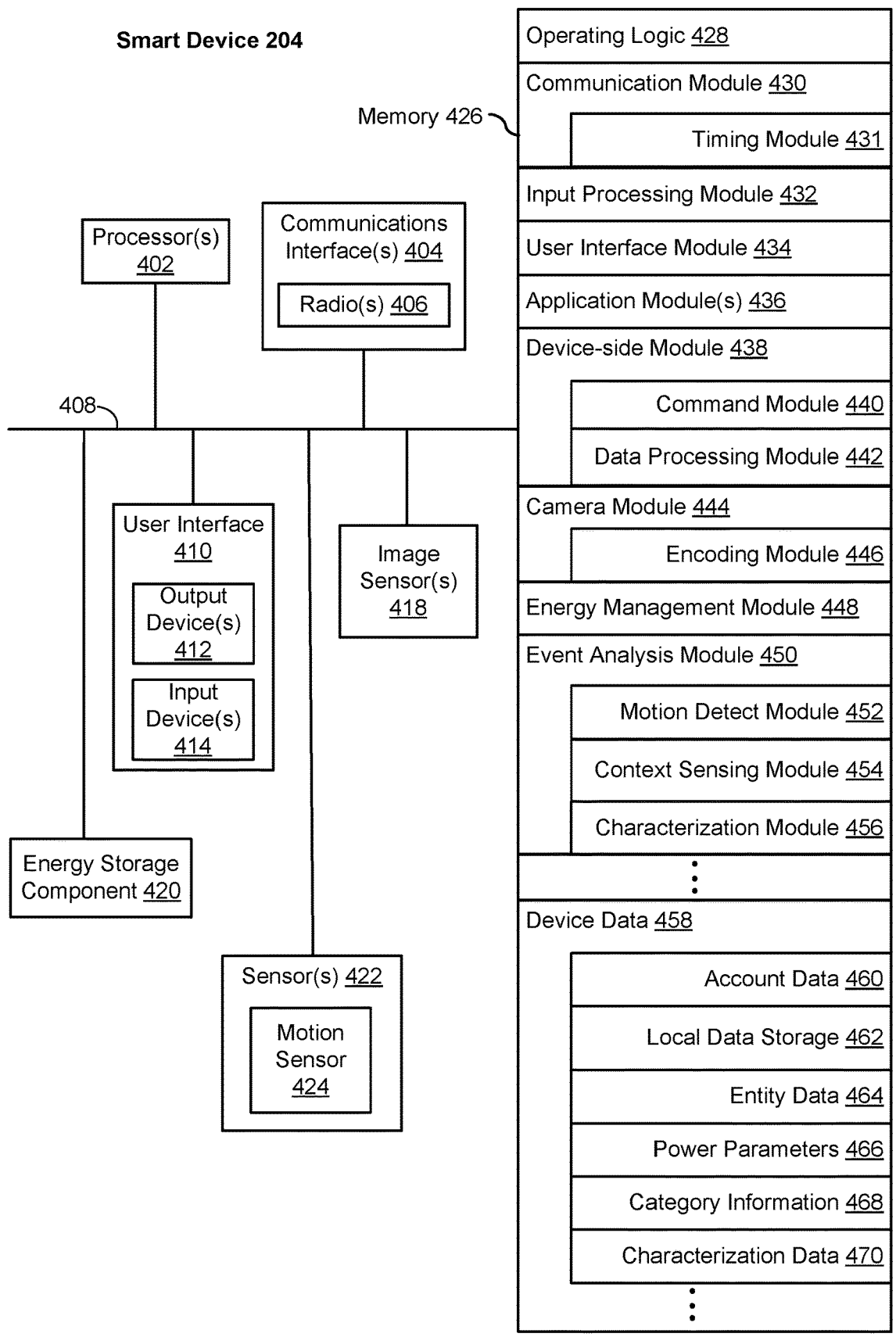
FIG. 4A is a block diagram illustrating a representative smart device in accordance with some implementations.

FIG. 4A is a block diagram illustrating a representative smart device 204 in accordance with some implementations. In some implementations, the smart device 204 (e.g., any devices of a smart home environment 100, FIG. 1) includes one or more processing units (e.g., CPUs, ASICs, FPGAs, microprocessors, and the like) 402, one or more communication interfaces 404 with radios 406, user interface 410, image sensor(s) 418, sensor(s) 422, energy storage component 420, memory 426, and one or more communication buses 408 for interconnecting these components (sometimes called a chipset). In some implementations, the user interface 410 includes one or more output devices 412 that enable presentation of media content, including one or more speakers and/or one or more visual displays. In some implementations, the user interface 410 includes one or more input devices 414, including user interface components that facilitate user input such as a keyboard, a mouse, a voice-command input unit or microphone, a touch screen display, a touch-sensitive input pad, a gesture capturing camera, or other input buttons or controls. In some implementations, an input device 414 for a doorbell 106 is a tactile or touch-sensitive doorbell button. Furthermore, some smart devices 204 use a microphone and voice recognition or a camera and gesture recognition to supplement or replace the keyboard.

The sensor(s) 422 include, for example, one or more thermal radiation sensors, ambient temperature sensors, humidity sensors, infrared (IR) sensors such as passive infrared (PIR) sensors, proximity sensors, range sensors, occupancy sensors (e.g., using RFID sensors), ambient light sensors (ALS), motion sensors 424, location sensors (e.g., GPS sensors), accelerometers, and/or gyroscopes.

In some implementations, the energy storage component 420 includes one or more batteries and/or capacitors. In some implementations, the energy storage component 420 includes a power management integrated circuit (IC). In some implementations, the energy storage component 420 includes circuitry to harvest energy from signals received via an antenna (e.g., the radios 406) of the smart device. In some implementations, the energy storage component 420 includes circuitry to harvest thermal, vibrational, electromagnetic, and/or solar energy received by the smart device. In some implementations, the energy storage component 420 includes circuitry to monitor a stored energy level and adjust operation and/or generate notifications based on changes to the stored energy level.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. The radios 406 enable one or more radio communication networks in the smart home environments, and enable a smart device 204 to communicate with other devices. In some implementations, the radios 406 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.).

The memory 426 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 426, or alternatively the non-volatile memory within the memory 426, includes a non-transitory computer-readable storage medium. In some implementations, the memory 426, or the non-transitory computer-readable storage medium of the memory 426, stores the following programs, modules, and data structures, or a subset or superset thereof:

- operating logic 429 including procedures for handling various basic system services and for performing hardware dependent tasks;
- a communication module 430 for coupling to and communicating with other network devices (e.g., a network interface 160, such as a router that provides Internet connectivity, networked storage devices, network routing devices, a server system 164, other smart devices 204, client devices 220, etc.) connected to one or more networks 162 via one or more communication interfaces 404 (wired or wireless);
- an input processing module 432 for detecting one or more user inputs or interactions from the one or more input devices 414 and interpreting the detected inputs or interactions;
- a user interface module 434 for providing and presenting a user interface in which settings, captured data, and/or other data for one or more devices (e.g., the smart device 204, and/or other devices in a smart home environment 100) can be configured and/or viewed;
- one or more applications 436 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- a device-side module 438, which provides device-side functionalities for device control, data processing and data review, including but not limited to:
    - a command module 440 for receiving, forwarding, and/or executing instructions and control commands (e.g., from a client device 220, from a server system 164, from user inputs detected on the user interface 410, etc.) for operating the smart device 204; and
    - a data processing module 442 for processing data captured or received by one or more inputs (e.g., input devices 414, image sensor(s) 418, sensors 422, interfaces (e.g., communication interfaces 404, radios 440), and/or other components of the smart device 204, and for preparing and sending processed data to a remote device (e.g., client devices 220) for review by a user;
- a camera module 444 for operating the image sensor(s) 418 and associated circuitry, e.g., for enabling and disabling the image sensor(s) 418 based on data from one or more low-power sensors 422 (e.g., data from a PIR sensor or ALS), including an encoding module 446 for adjusting encoding of raw image data captured by the image sensor(s) 418 (e.g., adjusting format, resolution, and/or framerate);

an event analysis module 450 for analyzing captured sensor data, e.g., to detect and/or recognize approaching visitors and context information, including but not limited to:
- a motion detect module 452 for detecting events in the smart home environment (e.g., motion events in the video data), such as an approaching visitor; and
- a context sensing module 454 for sensing context data regarding the approaching visitor, e.g., based on behavioral characteristics, timing information, and status of the smart home environment;

an energy management module 448 for managing energy usage of the smart device 204, e.g., by activating and deactivating various components of the smart device 204 based on energy levels of the energy storage component 420 and/or data captured by the sensor(s) 422 (e.g., in conjunction with the power parameters 466); and device data 548 storing data associated with devices (e.g., the smart device 204), including, but is not limited to:
- account data 460 storing information related to user accounts linked to the smart device 204, e.g., including cached login credentials, smart device identifiers (e.g., MAC addresses and UUIDs), user interface settings, display preferences, authentication tokens and tags, password keys, and the like;
- local data storage 462 for selectively storing raw or processed data associated with the smart device 204, such as event data and/or video data captured by the image sensor(s) 418;
- entity data 464 storing information related to detected persons and other entities, such as characterization information (e.g., characterization information 348) and associated images;
- power parameters 446 storing energy information, such as information related to the energy storage component 420 (e.g., estimated battery life), power settings of the smart device 204, a power state of the smart device 204, power preferences of user(s) of the smart device 204, and the like;
- category information 468 detailing event categories for categorizing events detected by, or involving, the smart device (e.g., in conjunction with the event analysis module 450); and
- characterization data 470 for entities, persons, and/or events detected by, or associated with, the smart device 204 (e.g., data generated or used by the characterization module 456).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 426, optionally, stores a subset of the modules and data structures identified above. Furthermore, the memory 426, optionally, stores additional modules and data structures not described above, such as a sensor management module for managing operation of the sensor(s) 422.

Figure 4B:
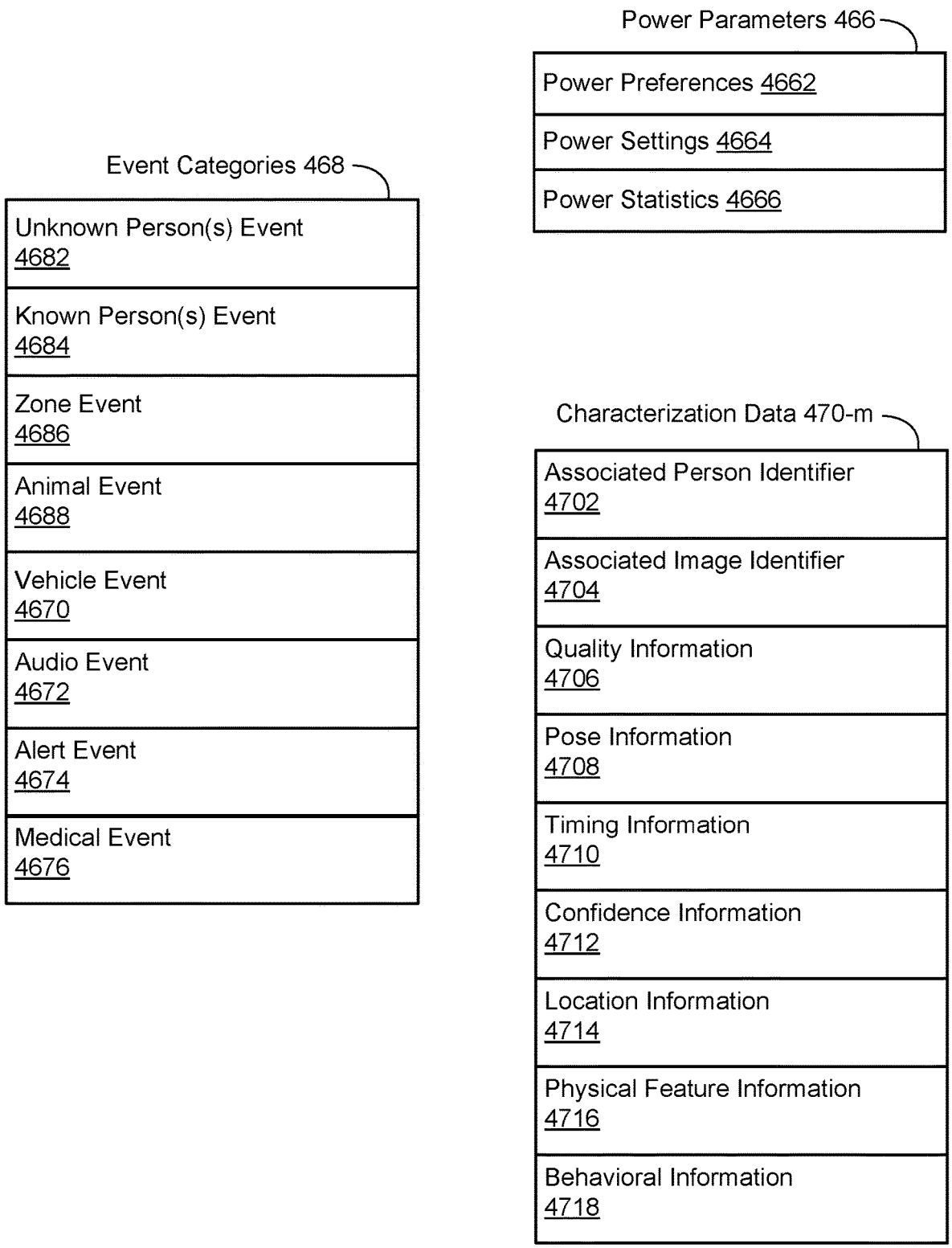
FIG. 4B illustrates various data structures used in some implementations.

FIG. 4B illustrates various data structures used by some implementations, including event categories 468, power parameters 466, and characterization data 470-$m$. The characterization data 470-$m$ is analogous to the characterization data 348-$m$ described above with respect to FIG. 3B. The event categories include one or more of an unknown person(s) event 4682 (an event involving one or more unknown or unrecognized person(s)), a known person(s) event 4684 (an event involving one or more known person(s)), a zone event 4686 (an event involving one or more zones of interest defined in a field of view of a camera), an animal event 4688 (an event involving one or more animals, such as one or more pets), a vehicle event 4670 (an event involving one or more vehicles, such as cars, motorcycles, and trains), an audio event 4672 (an event involving one or more detected sounds), an alert event 4674 (an event involving an alert generated at a smart device), and a medical event 4676 (an event involving a medical or health issue detected by a smart device). In some implementations, an event categorization for a particular event includes each of the event categories 468 that apply to the event. For example, a particular event is categorized as a combination of the event categories 468, such as an event involving known persons in a vehicle with one or more detected sounds. In some implementations, each event category 468 includes parameters and/or algorithms for determining whether a detected event falls into that category.

The power parameters 466 includes one or more of power preferences 4662, power settings 4664 and power statistics 4666. In some implementations, the power preferences 4662 include one or more explicit preferences received from a user of the smart device 204 and/or one or more implicit preferences based on activity of the user. In some implementations, the power preferences 4662 include one or more default preferences. In some implementations, the power settings 4664 include one or more settings for the energy storage component 420, one or more settings for the communications interface(s) 404, and/or one or more settings for the image sensor(s). In some implementations, at least some of the power settings 4664 are set by a user of the smart device 204. In some implementations, at least some of the power settings 4664 are based on an operating mode of the smart device 204. In some implementations, at least some of the power settings 4664 are based on a status of the energy storage component 420.

Figure 4C:
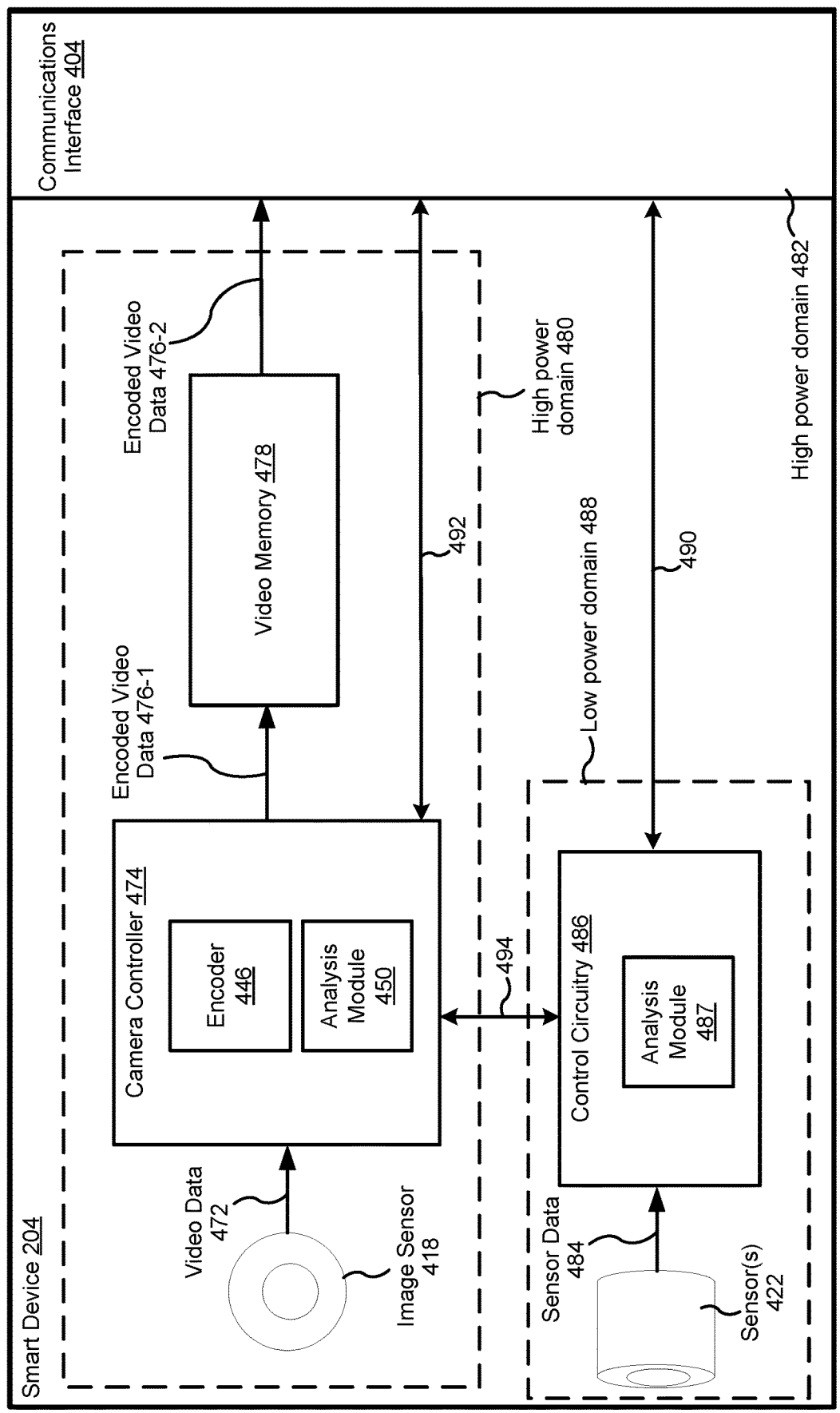
FIG. 4C is a block diagram illustrating a representative smart device in accordance with some implementations.

FIG. 4C is a block diagram illustrating a smart device 204 in accordance with some implementations. In FIG. 4C the smart device 204 includes components in a low power domain 488, components in a high power domain 480, and components in a high power domain 482. The low power domain 488 includes one or more of the sensor(s) 422 (e.g., a PIR sensor or ALS) and control circuitry 486. In some implementations, the control circuitry 486 governs operation of the sensor(s) 422 and/or analyzes data 484 from the sensor(s) 422 (e.g., via the analysis module 487). In some implementations, the control circuitry 486 determines whether to activate circuitry in the high power domains 480 and 482 based on analysis of the sensor data 484. For example, the control circuitry 486 determines, based on the sensor data 484, that motion is present in a field of view of the image sensor 418 and enables the image sensor 418 and associated circuitry to capture video data of the motion (e.g., via control signal(s) 494).

The high power domain 480 includes one or more image sensors 418, a camera controller 474, and video memory 478. In some implementations, components in the high power domain 480 are deactivated in some modes of operation to reduce energy consumption of the smart device 204. For example, in a power conservation mode, the image sensor 418 is deactivated until the sensor data 484 indicates that something of interest is occurring within the field of view of the camera, or a user requests live video from the smart device 204. In some implementations, the components in the high power domain 480 are individually activated in response to particular triggers. For example, in response to a user request to view video data stored in the video memory 478, the video memory and associated access circuitry is activated, while the image sensor 418 remains deactivated. In some implementations, the controller 474 governs operation of the image sensor 418 and/or analyzes video data 472 from the image sensor 418 (e.g., via the analysis module 450). In some implementations, the controller 474 governs encoding of the video data 472, e.g., based on network conditions, storage space in the video memory 478, whether the video data includes motion, one or more user preferences, a power mode of the smart device 204, server load, and the like. In some implementations, the controller 474 determines whether to activate circuitry in the high power domain 482 based on analysis of the video data 472. For example, the controller 474 determines, based on the video data 484, that a particular type of motion is present in a field of view of the image sensor 418 and, in accordance with the motion having the particular type, activates the communications interface 404 to transmit the encoded video data 476-2 to a remote computing system (e.g., a cloud server or client device).

The high power domain 482 includes the communications interface 404 and associated circuitry (e.g., the radio(s) 404, one or more receivers, one or more transmitters, and/or one or more transceivers). In some implementations, the communications interface 404 is configured to wirelessly couple to a local network (e.g., via Wi-Fi) to transmit video data 476-2 and/or sensor data 484 to a remote computing system. In some implementations, components in the high power domain 482 are deactivated in some modes of operation to reduce energy consumption of the smart device 204. For example, in a power conservation mode, the radio(s) 404 are deactivated until the sensor data 484 or video data 472 indicates that an event of interest has occurred, at which time the radio(s) 404 are activated to establish a wireless connection and transmit data regarding the event of interest. In some implementations, the communications interface 404 maintains one or more low power connections (e.g., connections consuming less than 60%, 40%, or 20% of a Wi-Fi connection) to receive updates and/or requests from remote systems (e.g., other smart devices or the server system 164) and/or a user of the smart device 204. In some implementations, the communications interface 404 intermittently (e.g., periodically) establishes a connection (e.g., a Wi-Fi connection) to check for, or receive, updates and/or requests from remote systems (e.g., other smart devices or the server system 164) and/or a user. In some implementations, the control circuitry 486 is configured to enable the communications interface 404 via control signal(s) 490. In some implementations, the controller 474 is configured to enable the communications interface 404 via control signal(s) 492.

Figure 5:
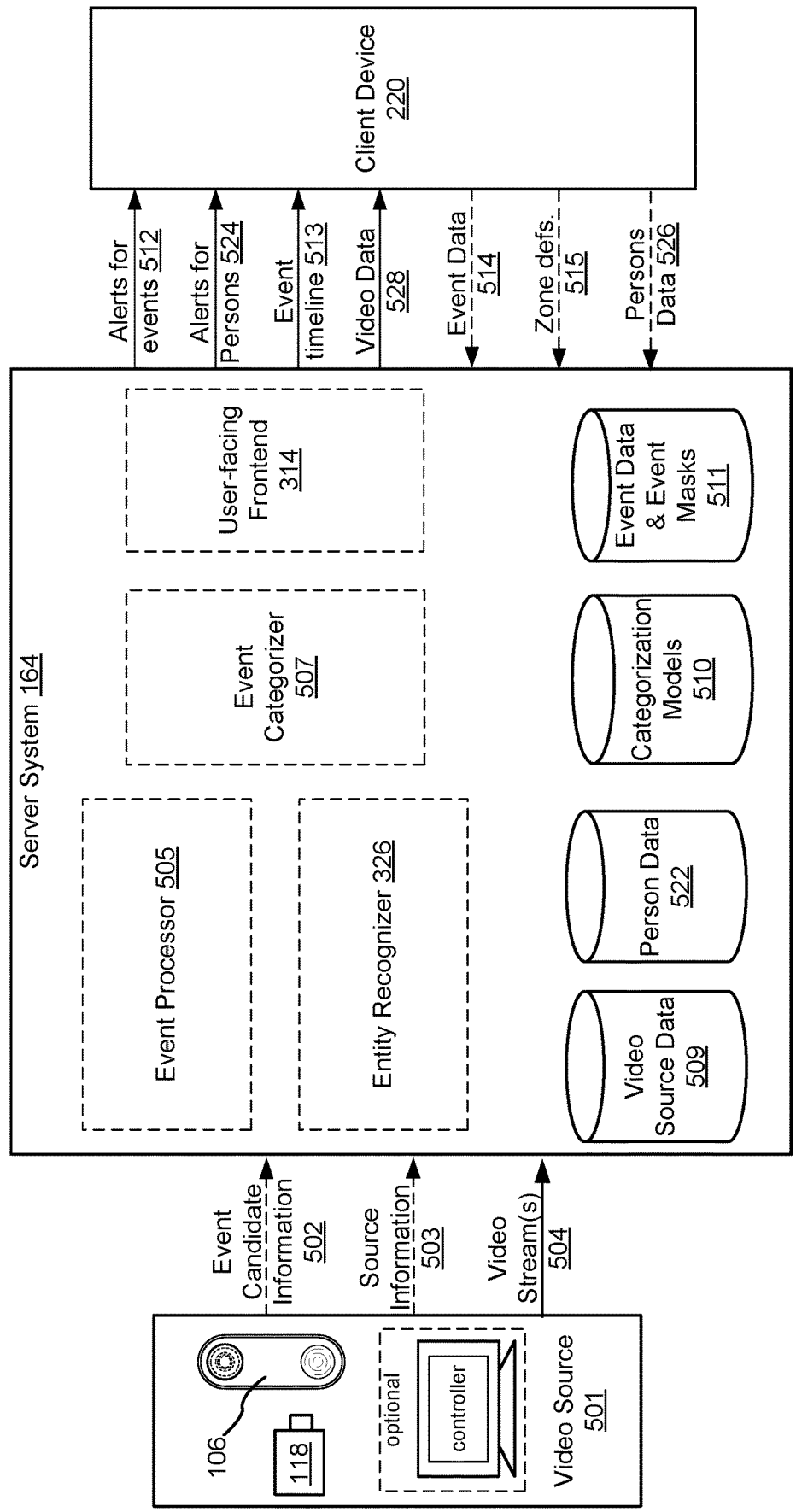
FIG. 5 illustrates representative system architecture for event analysis and categorization in accordance with some implementations.

FIG. 5 illustrates a representative system architecture 500 including video source(s) 501, server system 164, and client device(s) 220 in accordance with some implementations. In some implementations, the server system 164 includes functional modules for an event processor 505, an event categorizer 507, an entity recognizer 326, and a user-facing frontend 314. The event processor 505 obtains the event candidates (e.g., by processing the video stream(s) 504 or by receiving event start information from the video source 501, or by detecting a user press on a doorbell button of a doorbell camera). In some implementations, the event candidates comprise motion event candidates. In some implementations, the event candidates comprise audio event candidates. In some implementations, the event candidates include a user press on a doorbell button of a doorbell camera. In some implementations, the event candidates include audio, electromagnetic, olfactory, and/or visual aspects. In some implementations, the event candidates include motion events, approach detections, and announcement detections. The event categorizer 507 categorizes the event candidates into different event categories (e.g., based on data from the event processor and/or the entity recognizer). The user-facing frontend 314 generates event alerts and notifications, and facilitates review of the detected entities and events by a reviewer through a review interface on a client device 220. The user-facing frontend 314 also receives user edits on the event and entity categories, user preferences for alerts and event filters, zone definitions for zones of interest, and the like. The event categorizer optionally revises event categorization models and results based on the user edits received by the user-facing frontend. The entity recognizer optionally revises entity classifications and/or labels based on the user edits received by the user-facing frontend. The server system 164 also includes a video source data database 509, person data 522, event categorization models database 510, and event data and event masks database 511. In some implementations, the person data 522 includes a persons database. In some implementations, each of these databases is part of the server database 316 (e.g., part of data storage database 330).

The server system 164 receives one or more video stream(s) 504 from the video source 501 (e.g., a video source 222 from FIG. 2B) and optionally receives event candidate information 502, such as preliminary characterization information for detected entities and events (e.g., entity and event metadata from processing performed at the doorbell 106), and source information 503 such as device settings for a doorbell 106 (e.g., a device profile 338 for doorbell 106). In some implementations, the event processor 505 communicates with the video source 501 and/or one or more other devices of the smart home environment, e.g., to request additional image data, audio data, and sensor data, such as high definition images or metadata for the video stream(s) 504. The server system sends alerts for events 512, alerts for detected persons 524, event timeline information 513, and/or video data 528 (e.g., still images or video clips corresponding to the detected persons and/or events) to the client device 220. In some implementations, the alerts 512 distinguish visitor approach events from other types of motion events. In some implementations, the alerts 512 distinguish motion events captured at a doorbell 106 from motion events captured by other smart devices (e.g., cameras 118). The server system 164 optionally receives user information from the client device 220, such as event information 514 (e.g., edits to event categories), and zone definitions 515, and persons data 526 (e.g., classification of detected persons).

A data processing pipeline processes video information (e.g., a live video feed) received from a video source 501 (e.g., including a doorbell 106 and an optional controller device) and/or audio information received from one or more smart devices in real-time (e.g., within 10 seconds, 30 seconds, or 2 minutes) to identify and categorize events occurring in the smart home environment, and sends real-time event alerts (e.g., within 10 seconds, 20 seconds, or 30 seconds) and/or a refreshed event timeline (e.g., within 30 seconds, 1 minute, or 3 minutes) to a client device 220 associated with a reviewer account for the smart home environment. The data processing pipeline also processes stored information (such as stored video feeds from a video source 501) to reevaluate and/or re-categorize events as necessary, such as when new information is obtained regarding the event and/or when new information is obtained regarding event categories (e.g., a new activity zone definition is obtained from the user).

After video and/or audio data is captured at a smart device, the data is processed to determine if any potential event candidates or persons are present. In some implementations, the data is initially processed at the smart device (e.g., video source 501, camera 118, or doorbell 106). Thus, in some implementations, the smart device sends event candidate information, such as event start information, to the server system 164. In some implementations, the data is processed at the server system 164 for event start detection. In some implementations, the video and/or audio data is stored on server system 164 (e.g., in video and source data database 509). In some implementations, the visual/audio data is stored on a server distinct from server system 164. In some implementations, after a motion start is detected, the relevant portion of the video stream is retrieved from storage (e.g., from video and source data database 509).

In some implementations, the event identification process includes segmenting the video stream into multiple segments then categorizing the event candidate within each segment. In some implementations, categorizing the event candidate includes an aggregation of background factors, entity detection and identification, motion vector generation for each motion entity, entity features, and scene features to generate motion features for the event candidate. In some implementations, the event identification process further includes categorizing each segment, generating or updating an event log based on categorization of a segment, generating an alert for the event based on categorization of a segment, categorizing the complete event, updating the event log based on the complete event, and generating an alert for the event based on the complete event. In some implementations, a categorization is based on a determination that the event occurred within a particular zone of interest. In some implementations, a categorization is based on a determination that the event candidate involves one or more zones of interest. In some implementations, a categorization is based on audio data and/or audio event characterization.

The event analysis and categorization process may be performed by the smart device (e.g., the video source 501) and the server system 164 cooperatively, and the division of the tasks may vary in different implementations, for different equipment capability configurations, power parameters, and/or for different network, device, and server load situations. After the server system 164 categorizes the event candidate, the result of the event detection and categorization may be sent to a reviewer associated with the smart home environment.

In some implementations, the server system 164 stores raw or compressed video data (e.g., in a video and source data database 509), event categorization models (e.g., in an event categorization model database 510), and event masks and other event metadata (e.g., in an event data and event mask database 511) for each of the video sources 501. In some implementations, the video data is stored at one or more display resolutions such as 480p, 780p, 1080i, 1080p, and the like.

In some implementations, the video source 501 (e.g., the doorbell 106) transmits a live video feed to the remote server system 164 via one or more networks (e.g., the network(s) 162). In some implementations, the transmission of the video data is continuous as the video data is captured by the doorbell 106. In some implementations, the transmission of video data is irrespective of the content of the video data, and the video data is uploaded from the video source 501 to the server system 164 for storage irrespective of whether any motion event has been captured in the video data. In some implementations, the video data is stored at a local storage device of the video source 501 by default, and only video portions corresponding to motion event candidates detected in the video stream are uploaded to the server system 164 (e.g., in real-time or as requested by a user).

In some implementations, the video source 501 dynamically determines at what display resolution the video stream is to be uploaded to the server system 164. In some implementations, the video source 501 dynamically determines which parts of the video stream are to be uploaded to the server system 164. For example, in some implementations, depending on the current server load and network conditions, the video source 501 optionally prioritizes the uploading of video portions corresponding to newly detected motion event candidates ahead of other portions of the video stream that do not contain any motion event candidates; or the video source 501 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 501 implements two parallel upload connections, one for uploading the continuous video stream captured by the doorbell 106, and the other for uploading video portions corresponding to detected motion event candidates. At any given time, the video source 501 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 5, the video source 501 optionally includes a video doorbell 106 and an optional controller device. In some implementations, the doorbell 106 includes sufficient on-board processing power to perform all necessary local video processing tasks (e.g., cuepoint detection for motion event candidates, video uploading prioritization, network connection management, etc.), and the doorbell 106 communicates with the server system 164 directly, without any controller device acting as an intermediary. In some implementations, the doorbell 106 captures the video data and sends the video data to the controller device for the necessary local video processing tasks. The controller device optionally performs the local processing tasks for multiple cameras. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 164. In some implementations, the continuous video stream is sent and stored at one server facility while the video segments containing motion event candidates are send to and processed at a different server facility.

In some implementations, the smart device sends additional source information 503 to the server system 164. This additional source information 503 may include information regarding a device state (e.g., IR mode, AE mode, DTPZ settings, etc.) and/or information regarding the environment in which the device is located (e.g., indoors, outdoors, night-time, day-time, etc.). In some implementations, the source information 503 is used by the server system 164 to perform event detection, entity recognition, and/or to categorize event candidates. In some implementations, the additional source information 503 includes one or more preliminary results from video processing performed by the video source 501 (e.g., a doorbell 106), such as categorizations, object/entity recognitions, motion masks, and the like.

In some implementations, the video portion after an event start incident is detected is divided into multiple segments. In some implementations, the segmentation continues until event end information (sometimes also called an "end-of-event signal") is obtained. In some implementations, the segmentation occurs within the server system 164 (e.g., by the event processor 505). In some implementations, the segmentation comprises generating overlapping segments. For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real time initial categorization and alerts based on processing the first segment. The initial categorization may then be revised based on processing of subsequent segments. In some implementations, a new segment is generated if the motion entity enters a new zone of interest.

In some implementations, after the event processor module obtains the video portion corresponding to an event candidate, the event processor 505 obtains background factors and performs motion entity detection identification, motion vector generation for each motion entity, and feature identification. Once the event processor 505 completes these tasks, the event categorizer 507 aggregates all of the information and generates a categorization for the motion event candidate. In some implementations, the event processor 505 and the event categorizer 507 are components of the video processing module 3144. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for a motion event candidate is optionally based on zones of interest involved with the motion event candidate, background features, motion vectors, scene features, entity features, motion features, motion tracks, and the like.

In some implementations, the video source 501 has sufficient processing capabilities to perform, and does perform, entity detection, person recognition, background estimation, motion entity identification, the motion vector generation, and/or the feature identification.

FIG. 6 is a block diagram illustrating a representative client device 220 associated with a user account in accordance with some implementations. The client device 220, typically, includes one or more processing units (CPUs) 602, one or more network interfaces 604, memory 606, and one or more communication buses 608 for interconnecting these components (sometimes called a chipset). Optionally, the client device also includes a user interface 610 and one or more built-in sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 616, such as a GPS (global positioning satellite) sensor or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;
- a network communication module 620 for connecting the client device 220 to other systems and devices (e.g., client devices, electronic devices, and systems connected to one or more networks 162) via one or more network interfaces 604 (wired or wireless);
- an input processing module 622 for detecting one or more user inputs or interactions from one of the one or more input devices 614 and interpreting the detected input or interaction;
- one or more applications 624 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- a user interface module 626 for providing and displaying a user interface in which settings, captured data, and/or other data for one or more devices (e.g., smart devices 204 in smart home environment 100) can be configured and/or viewed;

a client-side module 628, which provides client-side functionalities for device control, data processing and data review, including but not limited to:

a device control module 630 for generating control commands for modifying an operating mode of smart devices (and optionally other electronic devices) in accordance with user inputs;

a video analysis module 632 for analyzing captured video data, e.g., to detect and/or recognize persons, objects, animals, and events, such as described previously with respect to video analysis module 442;

a data review module 634 for providing user interfaces for reviewing data from the server system 164 or video sources 222, including but not limited to:

an event review module 636 for reviewing events (e.g., motion and/or audio events), and optionally enabling user edits and/or updates to the events; and a persons review module 638 for reviewing data and/or images regarding detected persons and other entities, and optionally enabling user edits and/or updates to the persons data;

a presentation module 640 for presenting user interfaces and response options for interacting with the smart devices 204 and/or the server system 164; and a remote interaction module 642 for interacting with a remote person (e.g., a visitor to the smart home environment 100), e.g., via a smart device 204 and/or the server system 164; and client data 644 storing data associated with the user account and electronic devices, including, but not limited to:

account data 646 storing information related to both user accounts loaded on the client device and electronic devices (e.g., of the video sources 501) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and a local data storage database 648 for selectively storing raw or processed data associated with electronic devices (e.g., of the video sources 501, such as a doorbell 106), optionally including entity data described previously.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

Figure 7:
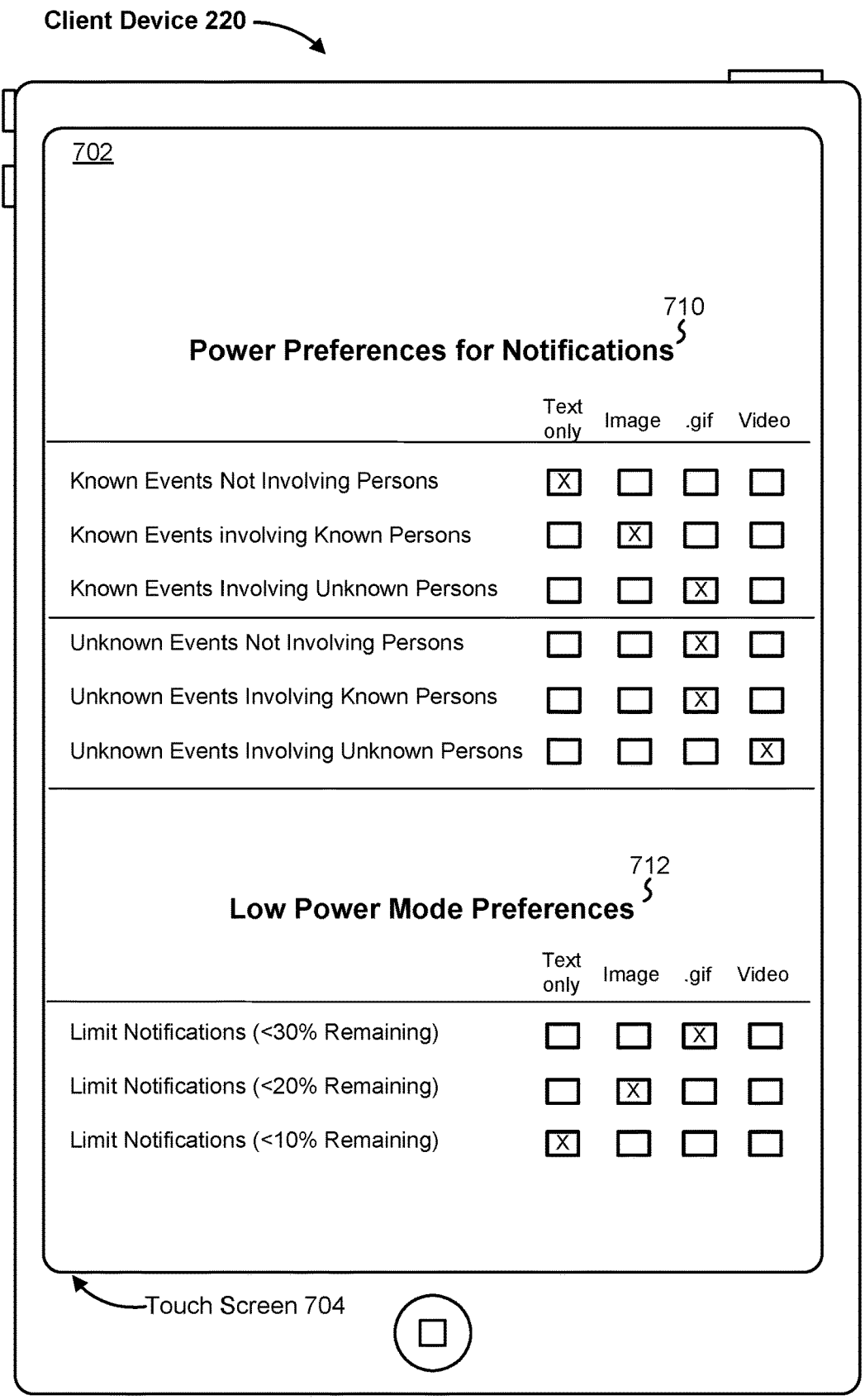
FIG. 7 illustrates a representative user interface for power preferences in accordance with some implementations.

FIG. 7 illustrates a user interface 702 for power preferences in accordance with some implementations. The user interface 702 includes a plurality of notification-related power preferences 710 enabling a user to set preferred notification types for various event types. In the example of FIG. 7, the camera device is set to generate text-only notifications for known events not involving persons, generate still-image notifications for known events involving known persons, and generate animated images (e.g., a gif) for known events involving unknown persons. Similarly, the user interface 702 further includes notification-related power preferences for unknown (unrecognized events).

An example of a known event not involving persons is a family pet exiting through a doggy door. A text-only notification for this event is, for example, a text stating that "Spot was just spotted leaving through his door." An example of a known event involving known persons is a household member returning home from work. A still-image notification for this event is, for example, an image of the household member with text stating that "John has returned home from work." An example of a known event involving known persons is a delivery person dropping off a package. An animated image notification for this event is, for example, a gif of the delivery person leaving the package with text stating that "The shoes you ordered have been delivered."

The user interface 702 also includes a plurality of low power preferences 712 enabling a user to limit video data transmissions to conserve power and extend battery life. In the example of FIG. 7, the camera device is set to limit notifications to animated images (e.g., gifs) when less than 30% battery-life remains. The camera device is also set to limit notifications to still-images when less than 20% battery-life remains, and limit notifications to text-only when less than 10% battery-life remains.

For example, based on the preferences shown in FIG. 7, in response to detecting an unknown event involving unknown persons, if more than 30% battery-life remains the camera will send a video clip to the user, if 20%-30% remains the camera will send a gif, if 10%-20% remains the camera will send a still image, and if less than 10% remains the camera will send a text notification. In some implementations, the user is enabled to limit quality of video data to conserve energy, such as resolution and frame rate.

Figure 8A:
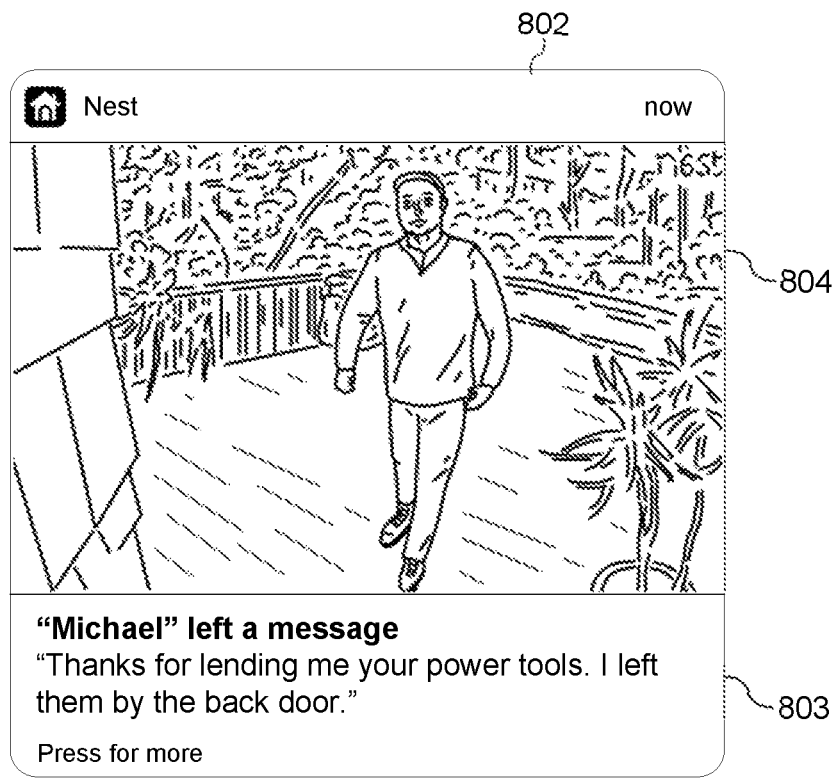
FIGS. 8A-8C illustrate representative event notifications in accordance with some implementations.
Figure 8A:
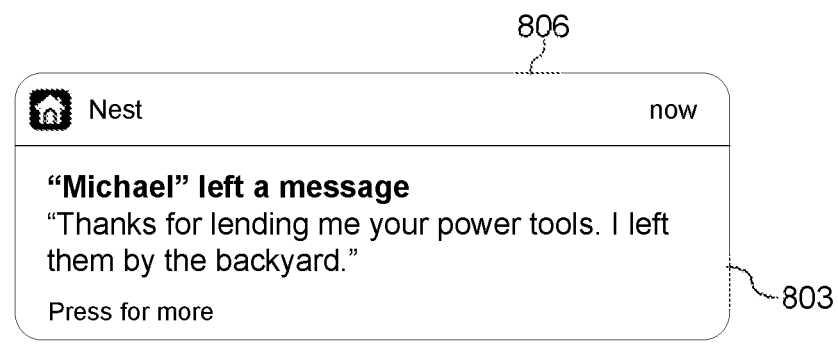
Figure 8B:
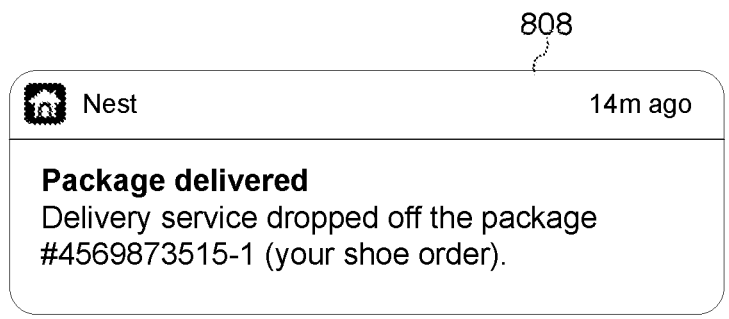
Figure 8B:
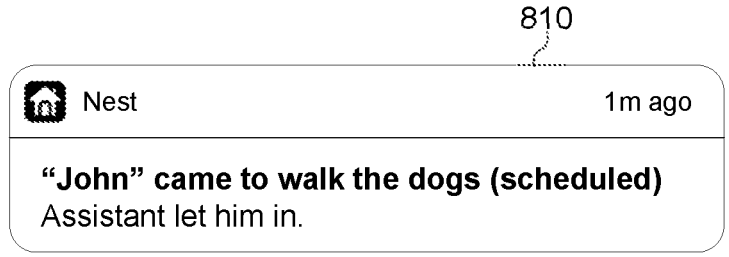
Figure 8B:
Figure 8B:
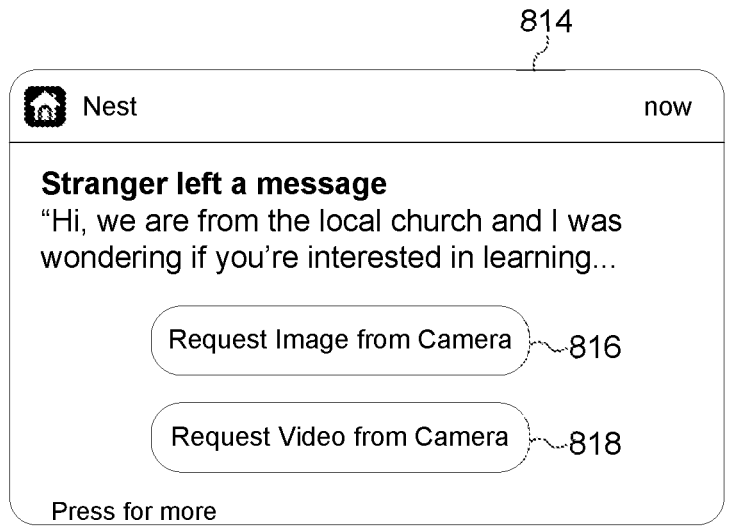
Figure 8C:
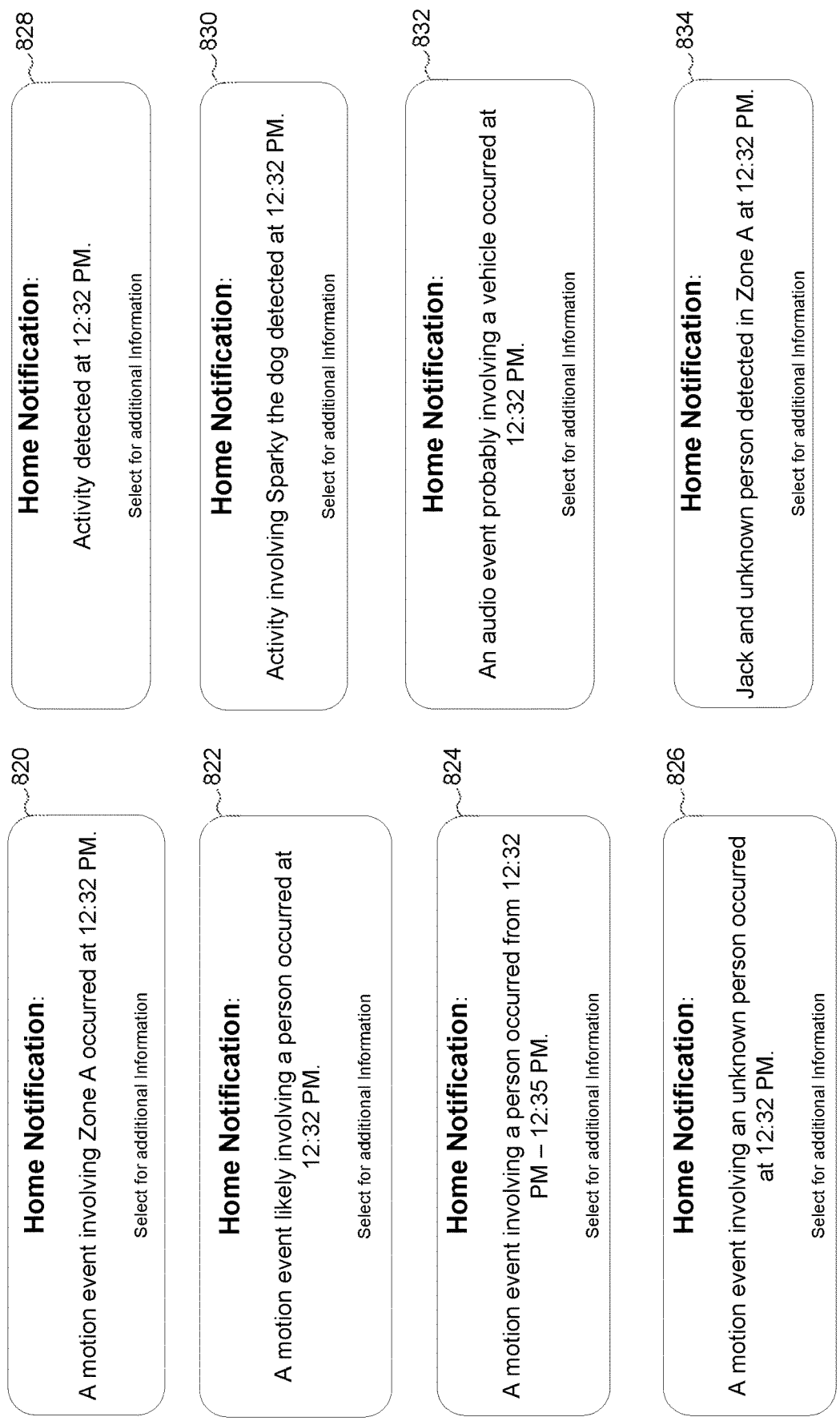

FIGS. 8A-8C illustrate representative event notifications, in accordance with some implementations. FIG. 8A illustrates event notifications 802 and 806 in accordance with some implementations. The event notification 802 includes a text portion 803 and a video data portion 804. The event notification 806 includes only the text portion 803. In some implementations and instances, the video data portion 804 includes a still-image, an animated set of images (e.g., a gif), and/or a video clip. In some implementations, the event notification 802 or 806 is selected based on one or more power parameters 466. In some implementations, the event notification 802 or 806 is selected based on the power preferences 710 and/or the power preferences 712. In accordance with some implementations, the text portion includes information identifying the visitor (e.g., "UPS," "Michael," and "Stranger"), as well as content information (e.g., a portion of the visitor's announcement message) and/or activity information (e.g., "left a message," "package delivered", and "assistant let him in"). In some implementations, an event notification includes a still-image (e.g., a headshot of the person involved) and a video clip of the activity (e.g., the person dropping off a package).

FIG. 8B illustrates event notifications 808, 810, 812, and 814 in accordance with some implementations. The event notification 808 includes a text portion categorizing the event (package delivery) and giving additional details regarding the event (identification of the package as the user's shoe order). In some implementations, the camera device identifies the package by recognizing an identifier on the package (e.g., a barcord, tracking number, or the like). In some implementations, the delivery person identifies the package to the camera device (e.g., "dropping off the girl scout cookies you ordered"). In some implementations, a remote system indicates that the package corresponds to a particular item or order (e.g., a delivery service notifies the smart home that a particular package was delivered). The event notification 810 includes a text portion categorizing the event (dogwalker arrival) and giving additional details (scheduled event and assistant granted entry). The event notification 812 also includes a text portion categorizing the event (known visitor) and giving additional details (Sharon's message).

The event notification 814 includes a text portion categorizing the event (unknown visitor) and giving additional details (visitor's message). The event notification 814 also includes affordances 816 and 818 enabling a user to request video data corresponding to the event. In some implementations, the affordances are provided on event notifications where the video data corresponding to the event is stored at the camera device. In some implementations, the affordances are provided on event notifications having a particular event type or category (e.g., events involving unknown persons). In some implementations, an event notification includes a video portion (e.g., showing a still-image of the event) and one or more affordances for requesting additional video data (e.g., an affordance to request a video clip of the event).

In some implementations, the event notification includes a text portion indicating the category of the motion event (e.g., a person event category) and the time the motion event occurred (e.g., "12:32 PM" or "10 seconds ago"). In some implementations, the event notification is displayed on a home or lock screen of a client device 220. In some implementations, in response to a user selection of event notification, a smart home application is opened or launched (e.g., utilizing client-side module 628, FIG. 6). In some implementations, in response to a user selection of the event notification, a video monitoring user interface is displayed. In some implementations, the user selection of the the event notification comprises a user swipe gesture over the portion of a touch screen of the client device corresponding to the event notification. In some implementations, the user selection of the event notification comprises a user tap gesture, or double-tap gesture, over the portion of a touch screen corresponding to the event notification. In some implementations, the event notification includes additional information, such as information regarding the smart devices involved in the motion event (e.g., the name of the camera that captured the motion event) and/or information regarding the duration of the motion event. In some implementations, the event notification includes one or more of: an affordance for opening a smart home application that presented (e.g., pushed) the notification, an affordance for requesting video data of the event, an affordance for initiating visual/audio playback of the event, an affordance for ignoring or cancelling the notification, and an affordance for snoozing the notification.

In some implementations, a user interface with multiple event notifications is presented, each event notification corresponding to a distinct event. For example, a user interface is presented that includes event notification corresponding to a motion event that occurred at 12:10 PM, and a second event notification corresponding to an audio event that occurred at 12:45 PM. In some implementations, the event notifications are sorted chronologically (e.g., with most recent alerts displayed on top). In some implementations, the event notifications are sorted by importance.

FIG. 8C illustrates representative event notifications in accordance with some implementations. In some implementations, each of the event notifications shown in FIG. 8C optionally includes video data (e.g., a video data portion 804) and/or an affordance or option for retrieving video data (e.g., affordances 816 and 818). In some implementations, the inclusion of video data and/or the video request affordances is based on a category of the event corresponding to the notification, a type of camera device that captured the event (e.g., battery-powered or line-powered device), and/or power parameter(s) of the camera device that captured the event (e.g., power preferences and/or remaining battery life). In some implementations, in response to a user selecting one of the notifications shown in FIG. 8C, the user is enabled to view or request video data for the corresponding event.

The event notification 820 includes a text message indicating that a motion event involving a particular zone (Zone A) had occurred at 12:32 PM. In some implementations, the particular zone is a zone of interest denoted by a user of the smart home application. In some implementations, "Zone A" is a user-defined title for the particular zone. The event notification 822 includes a text message indicating that a motion event likely involving a person had occurred at 12:32 PM. Thus, the event notification 822 conveys information regarding both an event category for the motion event and a confidence level for the category.

The event notification 824 includes a text message indicating that a motion event involving a person had occurred during a particular time period (12:32 PM-12:35 PM). Thus, the event notification 824 conveys information regarding both an event category for the motion event and a duration of the motion event. In accordance with some implementations, the notification 822 is generated as a first notification for a particular motion event and the notification 824 is generated as a second or updated notification for the particular motion event. For example, the notification 822 is generated based on an initial event category and corresponding confidence level for the motion event, such as an event category assigned after analyzing a few seconds (e.g., 5, 10, 15, or 30 seconds) of the motion event. In this example, the notification 824 is generated after analyzing the entire 3-minute event.

The event notification 826 includes a text message indicating that a motion event involving an unknown person had occurred at a particular time (12:32 PM). In some implementations, an unknown person comprises an unrecognized detected person. For example, a person is detected, but the person cannot be identified via facial recognition or otherwise. In some implementations, notification 826 is generated in accordance with a determination that the person is not recognized as any particular person with a confidence score meeting particular criteria. For example, the detected person is determined to be a known person, "John", with a confidence score of 48 and is determined to be "Paul" with a confidence score of 36. In this example, a confidence score below a confidence threshold of 60 results in the detected person not being identified as the known person. Thus, the detected person is not identified as either "John" or "Paul" and the corresponding text message states "unknown person."

The event notification 828 includes a text message indicating that activity was detected at a particular time (12:32 PM). In some implementations, the notification 828 is generated in accordance with a determination that the activity included no particular entities or objects. In some implementations, notification 828 is generated in accordance with a determination that no particular entities or objects in the motion event were recognized with sufficient confidence (e.g., above a predetermined confidence threshold).

The event notification 830 includes a text message indicating that activity involving a particular animal (Sparky the dog) was detected at a particular time (12:32 PM). In some implementations, the notification 830 corresponds to entity detection identifying a dog entity in the activity (e.g., motion event) and entity recognition identifying the dog entity as Sparky the dog. In some implementations, the notification 830 corresponds to a particular event category for Sparky the dog.

The event notification 832 includes a text message indicating that an audio event, probably involving a vehicle, occurred at a particular time (12:32 PM). In some implementations, an audio event comprises an event detected by one or more microphones (e.g., one or more microphones of a smart device 204). In some implementations, an audio event detected by a microphone is associated with a particular portion of a video feed from a camera. For example, an audio event triggered by a microphone on a smart thermostat is associated with a camera feed from a camera located in the vicinity of the smart thermostat (e.g., within the same room or space). Thus, a user may request and/or view video footage for a period of time immediately before, during, and/or immediately after the detected audio event. In some implementations, the audio event was determined to probably involve a vehicle based on an analysis of information from one or more smart devices, such as visual data from a camera or the detected audio data. In some implementations, notification 832 corresponds to a confidence score for the object detection meeting certain criteria, such as within a particular confidence range.

The event notification 834 includes a text message indicating that an event involving an identified person (Jack) and an unknown person occurred within a particular zone of interest (Zone A) at a particular time (12:32 PM). In some implementations, the event comprises one or more of: a motion event, an audio event, and an alert event. In some implementations, the notification 834 indicates that the person denoted as "Jack" was identified with a high confidence level. In some implementations, the notification 834 indicates that the person denoted as "unknown person" was either not identified or not identified with a high enough confidence level. For example, the unknown person was not identified as being any particular person with a corresponding confidence score above a confidence threshold. In some implementations, the notification 834 indicates that the event occurred at least in part within Zone A. In some implementations, Zone A corresponds to a user-defined zone of interest. In some implementations, Zone A corresponds to a recognized zone within a scene (e.g., a front door of a dwelling). In some implementations, notification 834 corresponds to an event category for events involving a known person, an unknown person, and a zone of interest. In some implementations, notification 834 corresponds to multiple event categories, such as an event category for events involving a recognized person, an event category for events involving an unknown person, and an event category for events involving a zone of interest.

In some implementations, one or more notification presentation characteristics are adjusted based on the corresponding event category. For example, notification involving unknown persons, such as notification 826, include an audio component whereas notifications involving known entities, such as notification 834 do not include an audio component. In some implementations, one or more notification display characteristics are adjusted based on the corresponding event category. For example, notifications involving a zone of interest, such as notification 820, include a colored border (e.g., a color corresponding to the particular zone of interest), whereas notification not involving a zone of interest, such as notification 822, include a black border. In some implementations, one or more notification presentation characteristics are adjusted based on the time since the event was detected (or occurred).

Figure 9A:
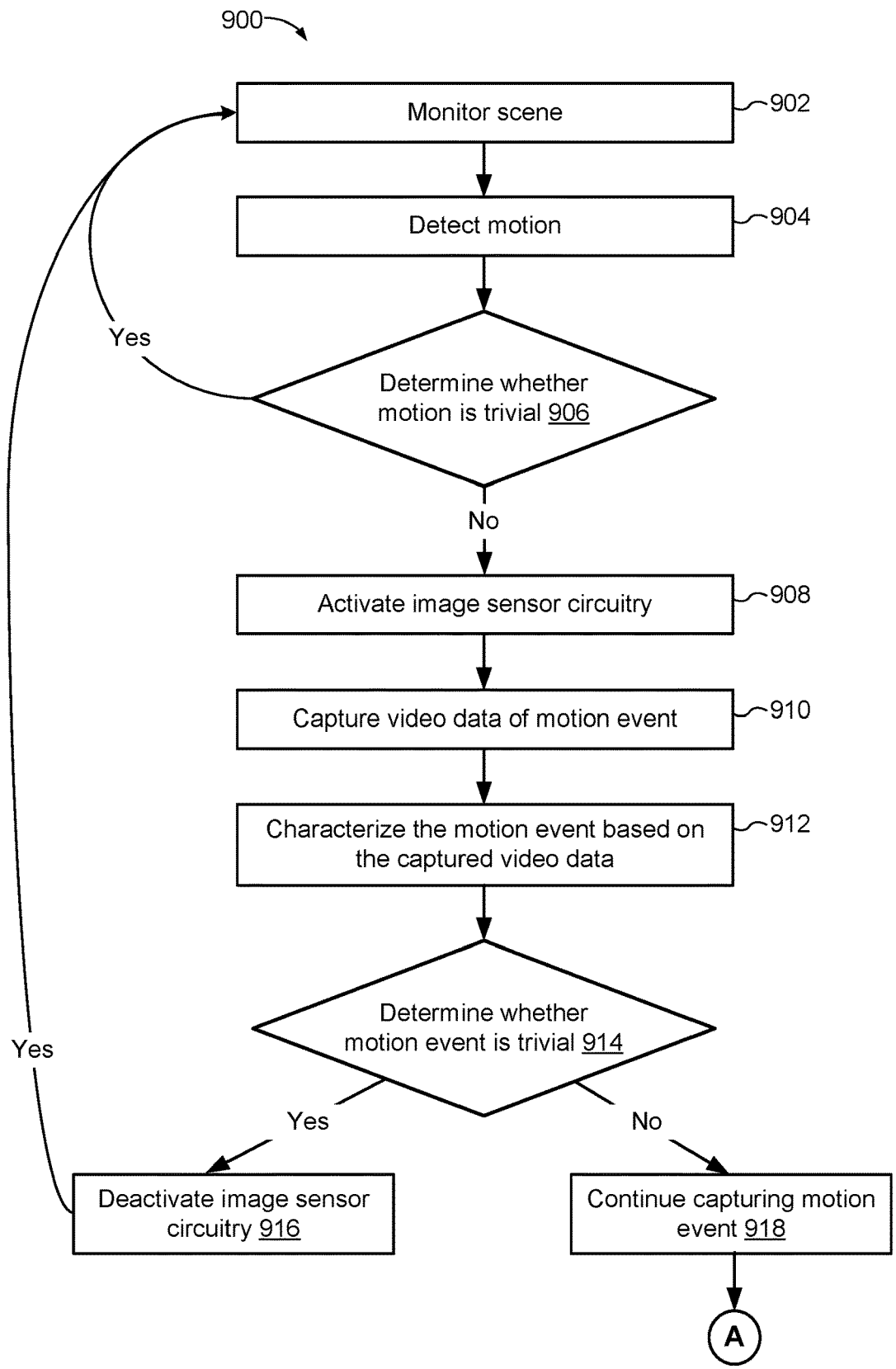
FIG. 9A-9C are flow diagrams illustrating a representative method of detecting and responding to motion events in accordance with some implementations.
Figure 9B:
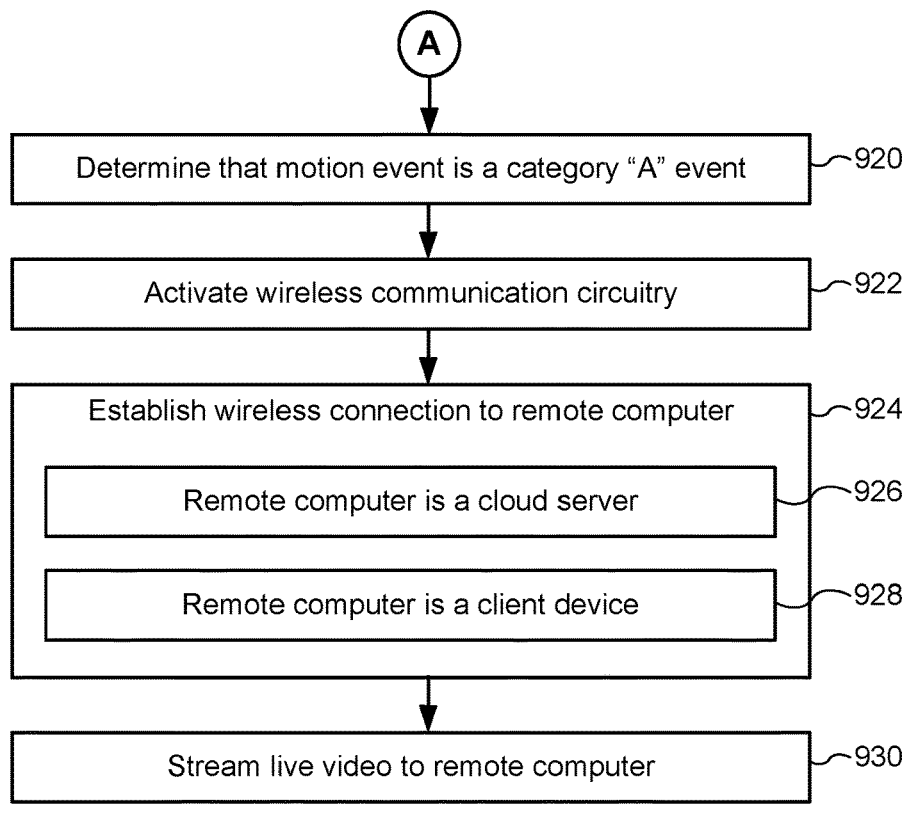
Figure 9B:
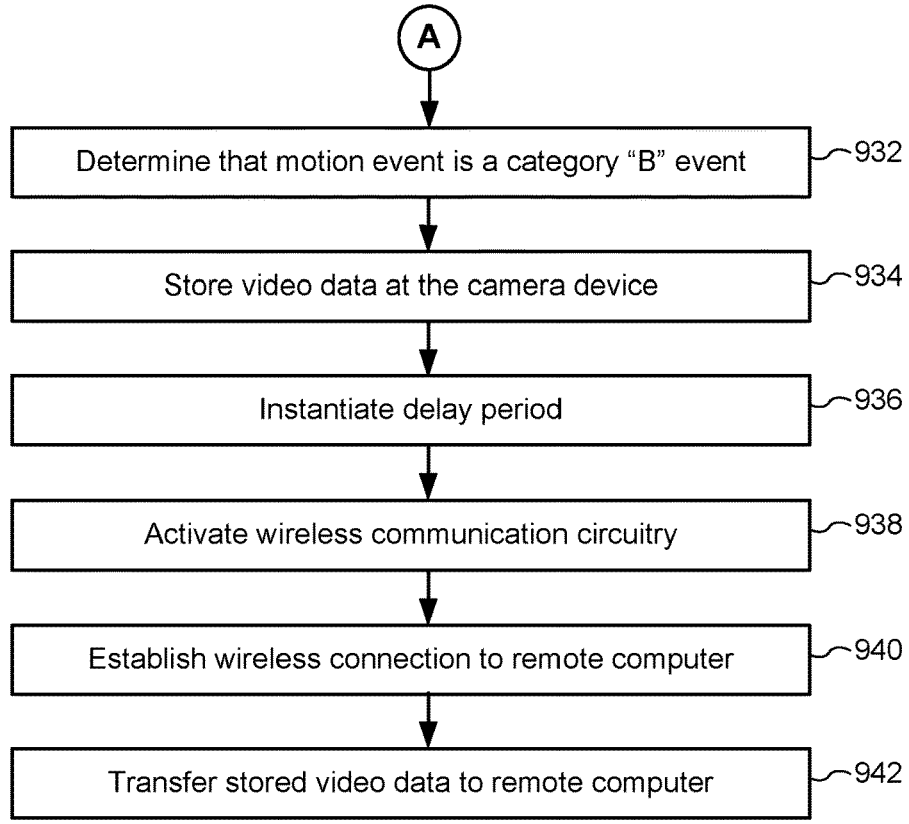
Figure 9C:
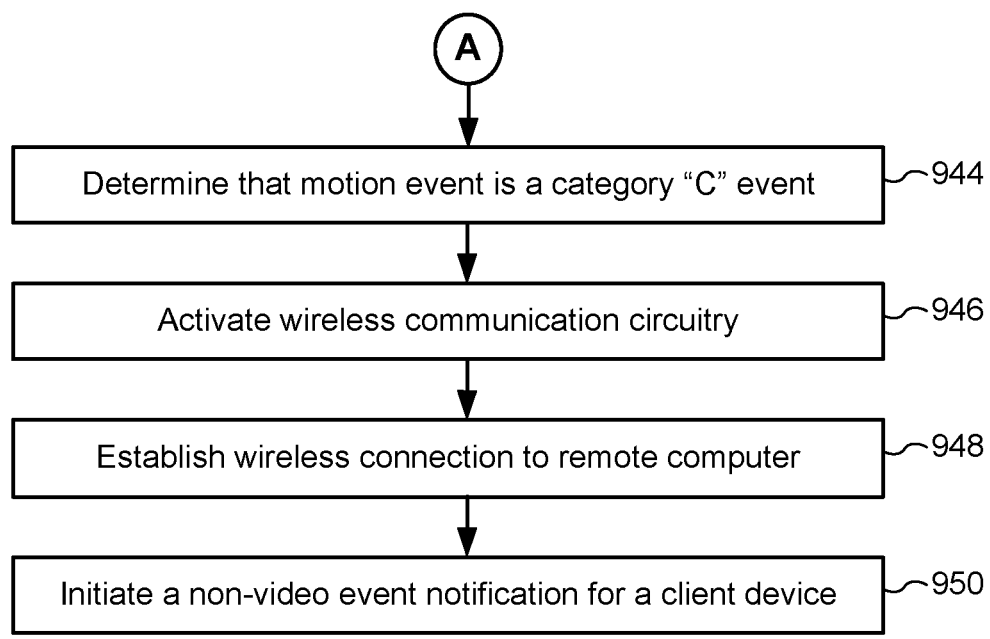

FIG. 9A-9C are flow diagrams illustrating a method 900 of detecting and responding to motion events in accordance with some implementations. In some implementations, the method 900 is performed by a camera device, such as a camera 118, smart doorbell 106, or other camera-equipped smart device 204. In some implementations, the method 900 performed by components of a smart device 204, such as energy management module 448 and event analysis module 450 in conjunction with image sensor(s) 418 and communications interface(s) 404. In some implementations, the operations of the method 900 described herein are interchangeable, and respective operations of the method 900 are performed by any of the aforementioned devices. In some embodiments, the method 900 is governed by instructions that are stored in a non-transitory computer-readable storage medium and that is executed by one or more processors or controllers of a device, such as the processor(s) 402, the camera controller 474, and/or the control circuitry 486. For convenience, the method 900 is described below as being performed by a camera device.

In some implementations, the camera device monitors (902) a scene (e.g., utilizing one or more of the sensors 422). In some implementations, the camera device monitors the scene using one or more non-image sensors, such as a PIR sensor or ALS. In some implementations, the camera device monitors the scene utilizing one or more components in a low power domain (e.g., within the low power domain 488). In some implementations, the camera device disables one or more high power domains while monitoring the scene (e.g., the high power domains 480 and 482). In some implementations, the camera device operates an image sensor (e.g., the image sensor 418) in a low power mode (e.g., a low resolution and/or low framerate mode) to monitor the scene.

In some implementations, the camera device detects (904) motion within the scene. In some implementations, rather than motion, the camera device detects one or more sounds (or other sensor data), and activates the image sensor based on analysis of the sounds or other sensor data.

In some implementations, the camera device determines (906) whether the detected motion is trivial (e.g., utilizing event analysis module 450 and/or device-side module 438). In some implementations: (1) in response to detecting the motion, the camera device determines whether the motion is trivial motion; and (2) in accordance with a determination that the motion is non-trivial, the camera device activates the image sensor to capture the plurality of images. In some implementations, in accordance with a determination that the motion is trivial, the camera device forgoes activating the image sensor and the wireless communication component.

In some implementations, in accordance with a determination that the motion is non-trivial, the camera device activates (908) image sensor circuitry (e.g., circuitry within the high power domain 480). In some implementations: (1) in response to detecting the motion, the camera device activates the image sensor to capture the plurality of images; and (2) the video information includes at least a subset of the plurality of images. In some implementations, in accordance with the determination that the motion is non-trivial, the camera device operates the image sensor in a high power mode (e.g., a high resolution, high framerate mode). In some implementations, the camera device activates the image sensor circuitry in response to data from one or more remote devices. For example, the camera device receives a notification from a remote motion sensor that non-trivial motion is present within the camera device's field of view, and, in response, the camera device activates the image sensor circuitry.

The camera device captures (910) video data of the motion event (e.g., utilizing the image sensor 418). In some implementations, while a wireless communication component of the camera device is deactivated, the camera device captures, with an image sensor, a plurality of images containing a motion event. In some implementations, prior to capturing the plurality of images and while the image sensor is deactivated, the camera device detects motion via a motion sensor (e.g., a PIR sensor, radar, or ALS), distinct from the image sensor.

The camera device characterizes (912) the motion event based on the captured video data (e.g., utilizing the event analysis module 452). In some implementations, the motion event is characterized based on the plurality of images and data from other sensors (e.g., motion detected via the motion sensor). In some implementations, characterizing the motion event comprises determining whether the motion event involves a person. In some implementations, the camera device determines whether the motion involves an animal, pet, vehicle, or the like. In some implementations, characterizing the motion event further comprises, in accordance with a determination that the motion event involves a person, determining whether the person is a known person.

The camera device determines (914) whether the motion event is trivial (e.g., the motion event is a tree swaying in the wind, a fan moving, or a television show). In some implementations, the camera device determines, based on the characterization of the motion event, whether to send video data to a remote computing system. In some implementations, the motion event is characterized based on a segment of video data (e.g., 2, 5, or 10 second). In some implementations, characterizing the motion event comprises determining whether the motion event comprises a known (recognized) motion event (e.g., dropping of a package, a car driving by, a tree moving, etc.). In some implementations, characterizing the motion event comprises determining whether the motion event comprises movement toward the camera device, e.g., a person approaching the camera device or home environment versus a person passing by the device or the home environment.

In some implementations, determining that a person is approaching the camera device comprises determining that the person is within a threshold distance to the camera device. For example, if a person is detected within a predetermined distance from the camera device, the person is determined to be an approaching visitor. For example, once the visitor is within 15 feet, 10 feet, or 5 feet of the camera device, an observation window is initiated and context information is obtained. In some implementations, initiating the observation window in response to the determination that the person is approaching the camera device includes initiating the observation window in response to the determination that the visitor is on a track to the camera device (e.g., has entered a walkway, hallway, or perimeter gate leading to the camera device).

In some implementations, the motion event is characterized based on context information. In some implementations, the context information includes timing information (e.g., time of day), a state of the smart home environment in which the camera device is installed (e.g., is the user home), whether motion is expected by the user (e.g., kids arriving home from school), and the like.

In some implementations, context information includes a detected announcement event (e.g., a doorbell button press, a door knock, or a verbal announcement), or an absence of detected announcement events during a predetermined time threshold. For example, a visitor who rings the doorbell within 5 seconds of reaching the entryway may warrant a different response from the smart home environment than a visitor who has reached the entryway but has lingered for more than 30 seconds without ringing the doorbell or knocking on the door. In some implementations, a doorbell press, door knock, or verbal announcement is part of a pre-assigned pattern of doorbell presses or door knocks associated with, or is otherwise associated with, a known visitor. For example, the smart home environment (e.g., a smart doorbell) determines that a particular visitor always knocks at a particular location on the door, in a particular pattern, and with a particular amount of force. In this example, the smart home environment associates such knock attributes with the particular visitor. In another example, a visitor profile for a particular visitor is set (e.g., set manually by a user, or set via machine learning) to associate a particular knock pattern, a particular doorbell ring pattern, or a particular verbal announcement with the particular visitor.

In some implementations, context information is based on a facial recognition analysis result, one or more behavior characteristics of the visitor, one or more physical characteristics of the visitor, one or more clothing and/or accessory characteristics of the visitor, a time of day during which the visitor approaches the entryway, a day of the week during which the visitor approaches the entryway, audio data from the smart home environment, proximity in time to a prescheduled event, proximity in time to a prescheduled status of the smart home environment, a known or unknown status of a user, an expected or unexpected status of a user, a location of a user, an identity of a user, and/or one or more detected visitor actions (e.g., a doorbell activation, a door knock, an audio announcement, and/or any other interaction between the visitor and the smart home environment). In some implementations, the context information is based on a timing of the one or more detected visitor actions (e.g., how long it took for the visitor to press the doorbell or knock on the door since the visitor was detected or was determined to have been approaching or in proximity to the entryway, or how long the visitor has been lingering without pressing the doorbell or knocking on the door since the visitor was detected or was determined to have been approaching or in proximity to the entryway).

In some implementations, the context information includes characteristics of the visitor, such as height, gender, age, and the like. In some implementations, the context information includes determined biometrics of the visitor. In some implementations, if a group of visitors approach the entryway together, the context information includes the number of visitors and/or identified interactions between the visitors. In some implementations, the context information includes information regarding whether the visitor is holding any items and/or identification of such items (e.g., a box, crowbar, or food items). In some implementations, the context information includes information regarding any active or recent (e.g., within the last hour, day, or week) security alerts in the vicinity of the smart home (e.g., within a block, a mile, or 10 miles). In some implementations, the context information includes information regarding previous visitors to the smart home (e.g., whether previous visitors were criminals, salesmen, or neighbors).

In some implementations, context information includes audio data, such as a verbal announcement (examples of which are described above) or conversation of the visitor. Further examples include background noise from sources other than the visitor (e.g., a barking dog, a police siren, or any other sound that may provide context for the visit).

In some implementations, context information includes any combination of the above examples. In some implementations, individual subsets of context information are weighted, and the context information is a weighted combination of the individual subsets of context information. For example, brightness information or time-of-day information may be weighted more heavily than identity information (e.g., if the pool cleaner approaches the entryway in the middle of the night, the time-of-day information is more relevant in determining contextual information for the approaching visitor, and is therefore more heavily weighted).

In some implementations, in accordance with a determination that the motion event is trivial, the camera device deactivates (916) the image sensor circuitry. In some implementations, in accordance with a determination not to send video data to the remote computing system, the camera device forgoes activating the wireless communication component.

In some implementations, in accordance with a determination not to send video data to the remote computing system, the camera device stores the plurality of images at the camera device (e.g., within the video memory 478). For example, the camera device stores the video data for a preset period of time, until overwritten by later video data, or until a user indicates that the video data should be discarded or transferred to another computing system.

In some implementations, after storing the plurality of images, the camera device (1) receives a request from a user of the camera device to view the motion event; and (2) in response to the user request, sending the stored plurality of images to the remote computing system. For example, the user requests the images via a notification affordance, such as the affordance 818 in FIG. 8B. In some implementations, the camera device sends a subset of the stored images, such as a single still image or a gif generated from the images.

In some implementations, the camera device is configured to send video data for all motion events to the remote computing systems. For example, the user has selected preferences (e.g., as illustrated in FIG. 7) requesting for video data for all types of events. In some implementations, for video data to be sent to the remote computing system, the camera device stores video data locally before sending the data to the remote computing system so as to more efficiently send the data to the remote computing system. For example, the camera device first stores the video data locally so as to ensure that the video data is transferred to the remote computing system as full packets, thereby reducing an amount of time needed to transfer the video data. In some implementations, the video data is stored locally and compressed, then the compressed version of the video data is transferred to the remote computing system as full packets of data (e.g., full Wi-Fi packets).

In some implementations, in accordance with a determination that the motion event is non-trivial, the camera device continues capturing (918) video data of the motion event. For example, the camera device continues captured video data until the motion event ends (e.g., until motion is no longer detected). In some implementations, after capturing images of the motion event, the camera device disables the image sensor to conserve power. For example, after determining that the motion event has ended, the camera device disables components in the high power domain 480. In some implementations: (1) the motion event is characterized based on a segment of video data from the image sensor; and the camera device (a) determines, based on the characterization of the motion event, whether to continue to capture video data from the image sensor; and (b) in accordance with a determination not to continue to capture video data, disabling the image sensor to conserve power. In some implementations, in accordance with a determination not to continue to capture video data, the camera device initiates sending a notification to a user of the camera device. In some implementations, one or more additional components are also deactivated, such as an image signal processor, video memory, LEDs, and the like.

In some implementations, in accordance with a determination to send video data to the remote computing system, the camera device: (1) activates the wireless communication component of the camera device; (2) establishes a wireless connection to the remote computing system via the wireless communication component; and (3) sends video information to the remote computing system via the established wireless connection. In some implementations, the remote computing system comprises a cloud server. In some implementations, the remote computing system comprises a client device.

In some implementations, the video information includes information regarding the characterization of the motion event and at least a subset of the plurality of images. For example, the video information includes the images shown in the video portion 804 of the notification 802 and the information shown in the text portion 803.

In some implementations, prior to sending the video information, the camera device stores the video data at the camera device so as to improve efficiency of a wireless transfer of the video information. In some implementations, the camera device compresses the video data and transfers the compressed video data so as to improve efficiency of the wireless transfer. For example, the camera device stores the video data until the event ends, then activates the communication circuitry and sends the video data. In this way the camera device can fully utilize the wireless connection and reduce the time the wireless connection needs to be maintained.

In some implementations, after sending the video information, the camera device disables the wireless communication component to conserve power. For example, the camera device disables the wireless communication component until it is activated again in response to a new event of interest.

In some implementations, the camera device determines (920) a category (e.g., category "A") of the event (e.g., utilizing characterization module 456 in conjunction with category information 468 and/or characterization data 470). In some implementations, in accordance with determining that the event has a particular category (e.g., category "A"), the camera device: (1) activates (922) wireless communication circuitry; (2) establishes (924) a wireless connection to a remote computer; and (3) streams (930) live video to the remote computer. In some implementations, the remote computer is (926) a cloud server (e.g., a cloud server configured to manage multiple smart home accounts and environments) such as the server system 164. In some implementations, the remote computer is (928) a client device, such as the client device 220.

In some implementations, the camera determines whether to send video data to the remote computing system based on the particular category and one or more power parameters of the camera device. In some implementations, the one or more power parameters include a measure of remaining battery power for the camera device. In some implementations, the camera device (1) receives one or more power preferences from a user of the camera device; and (2) sets the one or more power parameters based on the one or more power preferences (e.g., the user preferences illustrated in FIG. 7). In some implementations, the one or more power preferences include a user preference to send a particular type of video data for one or more motion event types. For example, a user preference to send a still image for motion involving known persons, a user preference to send gifs for recognized motion involving unknown persons (delivering a package), and a user preference to send a video stream for unrecognized motion determined to be non-trivial. In some implementations, the one or more power preferences include a user preference on whether to operate in a power-conservation mode.

In some implementations: (1) the camera device comprises a doorbell (e.g., the doorbell 106); and (2) the determination of whether to send video data to the remote computing system is based on whether the doorbell is activated proximate in time to the detected motion event, e.g., within 30 seconds, 1 minute, or 2 minutes of the start (or end) of the detected motion.

In some implementations: (1) in accordance with the determination to send video data to the remote computing system, the camera device determines a format and an amount of the plurality of images to send; and (2) the video information comprises the determined amount of the plurality of images in the determined format. For example, sending a still image, a gif, a video at low, medium, or high resolution, and/or a video a low, medium, or high framerate. As another example, sending a portion of an image (or set of images) such as a headshot or a portion of the frame involving the motion.

In some implementations, in accordance with determining (932) that the event has a particular category (e.g., category "B"), the camera device: (1) stores (934) video data of the motion event at the camera device; (2) instantiates (936) a delay period; (3) activates (938) wireless communication circuitry; (4) establishes (940) a wireless connection to a remote computer; and (5) transfers (942) at least a portion of the stored video data to the remote computer. In some implementations: (1) in accordance with the determination to send video data to the remote computing system, the camera device determines whether to delay sending the video data; and (2) the wireless communication component is activated in accordance with a determination not to delay sending the video data. For example, sending the video data promptly (in real time or within 2, 5, 10 minutes). In some implementations: (1) in accordance with a determination to delay sending the video data, the camera device instantiates a delay period; and (2) the wireless communication component is activated upon completion of the delay period. In some implementations, the delay period is a preset period of time. In some implementations, the delay period is to a particular time of day, day of the week, day of the month, etc. In some implementations, the delay period comprises a storage period during which the user can request the video data (e.g., the data is stored for two weeks (or until overwritten) in case the user wishes to view it).

In some implementations, in accordance with determining (9344) that the event has a particular category (e.g., category "C"), the camera device: (1) activates (946) wireless communication circuitry; (2) establishes (948) a wireless connection to a remote computer; and (3) initiates a non-video event notification for a client device (e.g., a text notification, such as the notification 806).

In some implementations, in accordance with a determination not to send video data to the remote computing system, the camera device initiates generation of a text notification (e.g., via the communication module 430 in conjunction with the communications interface(s) 404) of the motion event for sending to a user of the camera device (e.g., the homeowner, or account holder linked to the device).

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first category could be termed a second category, and, similarly, a second category could be termed a first category, without departing from the scope of the various described implementations. The first category and the second category are both categories, but they are not necessarily the same category.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations.

However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method performed at a camera device having memory, one or more processors, and an image sensor, the method comprising:
while a wireless communication component of the camera device is deactivated:
capturing, with the image sensor, a plurality of images, two or more of the plurality of images including a motion event;
characterizing the motion event based on at least one of the plurality of images;
deactivating the image sensor in accordance with a determination, based on the characterization of the motion event, to not continue to capture additional images via the image sensor; and
determining, based on the characterization of the motion event, whether to send one or more of the plurality of images to a remote computing system; and
in accordance with a determination to send the one or more of the plurality of images to the remote computing system:
activating the wireless communication component of the camera device;
establishing a wireless connection to the remote computing system via the wireless communication component; and
sending data relating to the one or more of the plurality of images to the remote computing system via the established wireless connection.

2. The method of claim 1, further comprising, in accordance with the determination to send the one or more of the plurality of images to the remote computing system, determining a format and an amount of the plurality of images to send; and
wherein the data relating to the one or more of the plurality of images comprises the determined amount of the one or more of the plurality of images in the determined format.

3. The method of claim 1, further comprising, in accordance with the determination to send the one or more of the plurality of images to the remote computing system, determining whether to delay sending the one or more of the plurality of images; and
wherein the wireless communication component is activated in accordance with a determination not to delay sending the one or more of the plurality of images.

4. The method of claim 3, further comprising, in accordance with a determination to delay sending the one or more of the plurality of images, instantiating a delay period; and
wherein the wireless communication component is activated upon completion of the delay period.

5. The method of claim 1, wherein the data relating to the one or more of the plurality of images includes information regarding the characterization of the motion event and at least a subset of the plurality of images.

6. The method of claim 1, further comprising, after sending the data relating to the one or more of the plurality of images, disabling the wireless communication component to conserve power.

7. The method of claim 6, further comprising, prior to sending the data relating to the one or more of the plurality of images, storing the one or more of the plurality of images at the camera device so as to improve efficiency of a wireless transfer of the data relating to the one or more of the plurality of images.

8. The method of claim 1, further comprising, prior to capturing the plurality of images and while the image sensor is deactivated, detecting motion via a motion sensor, distinct from the image sensor.

9. The method of claim 8, further comprising, in response to detecting the motion, activating the image sensor to capture the plurality of images; and
wherein the data relating to the one or more of the plurality of images includes at least a subset of the plurality of images.

10. The method of claim 8, further comprising:
in response to detecting the motion, determining whether the motion is trivial motion; and
in accordance with a determination that the motion is non-trivial, activating the image sensor to capture the plurality of images.

11. The method of claim 10, wherein the motion event is characterized based on the plurality of images and the motion detected via the motion sensor.

12. The method of claim 10, further comprising, after capturing the plurality of images, disabling the image sensor to conserve power.

13. The method of claim 1, further comprising, in accordance with a determination not to send the one or more of the plurality of images to the remote computing system, forgoing activating the wireless communication component.

14. The method of claim 1, further comprising, in accordance with a determination not to send the one or more of the plurality of images to the remote computing system, storing the plurality of images at the camera device.

15. A method performed at a camera device having memory, one or more processors, and an image sensor, the method comprising:
while a wireless communication component of the camera device is deactivated:
capturing, with the image sensor, a plurality of images containing a motion event;
characterizing the motion event, including determining whether the motion event involved a person; and
determining, based on the characterization of the motion event, whether to send one or more of the plurality of images to a remote computing system;
in accordance with a determination to send the one or more of the plurality of images to the remote computing system:
activating the wireless communication component of the camera device;
establishing a wireless connection to the remote computing system via the wireless communication component; and
sending data relating to the one or more of the plurality of images to the remote computing system via the established wireless connection; and
in accordance with a determination not to send the one or more of the plurality of images to the remote computing system:
storing the plurality of images at the camera device;
after storing the plurality of images, receiving a request from a user of the camera device to view the motion event; and in response to the user request, sending the stored plurality of images to the remote computing system.

16. A method performed at a camera device having memory, one or more processors, and an image sensor, the method comprising:
while a wireless communication component of the camera device is deactivated:
capturing, with the image sensor, a plurality of images containing a motion event;
characterizing the motion event, including determining whether the motion event involved a person; and
determining, based on the characterization of the motion event, whether to send one or more of the plurality of images to a remote computing system;
in accordance with a determination to send the one or more of the plurality of images to the remote computing system:
activating the wireless communication component of the camera device;
establishing a wireless connection to the remote computing system via the wireless communication component; and
sending data relating to the one or more of the plurality of images to the remote computing system via the established wireless connection; and
in accordance with a determination not to send the one or more of the plurality of images to the remote computing system, initiating generation of a text notification of the motion event for sending to a user of the camera device.

17. The method of claim 1, wherein the determining whether to send the one or more of the plurality of images to the remote computing system is further based on one or more power parameters of the camera device.

18. A method performed at a camera device having memory, one or more processors, and an image sensor, the method comprising:
while a wireless communication component of the camera device is deactivated:
capturing, with the image sensor, a plurality of images containing a motion event;
characterizing the motion event, including determining whether the motion event involved a person; and
determining, based on the characterization of the motion event, whether to send one or more of the plurality of images to a remote computing system;
in accordance with a determination to send the one or more of the plurality of images to the remote computing system:
activating the wireless communication component of the camera device;
establishing a wireless connection to the remote computing system via the wireless communication component; and
sending data relating to the one or more of the plurality of images to the remote computing system via the established wireless connection; and
wherein the determining whether to send the one or more of the plurality of images to the remote computing system is further based on one or more power parameters of the camera device, the one or more power parameters including a measure of remaining battery power for the camera device.

19. A method performed at a camera device having memory, one or more processors, and an image sensor, the method comprising:
receiving one or more power preferences from a user of the camera device;
setting one or more power parameters based on the one or more power preferences;
while a wireless communication component of the camera device is deactivated:
capturing, with the image sensor, a plurality of images containing a motion event;
characterizing the motion event, including determining whether the motion event involved a person; and
determining, based on the characterization of the motion event and the one or more power parameters of the camera device, whether to send one or more of the plurality of images to a remote computing system; and
in accordance with a determination to send the one or more of the plurality of images to the remote computing system:
activating the wireless communication component of the camera device;
establishing a wireless connection to the remote computing system via the wireless communication component; and
sending data relating to the one or more of the plurality of images to the remote computing system via the established wireless connection.

20. The method of claim 19, wherein the one or more power preferences include a user preference to send a particular type of the one or more of the plurality of images for one or more motion event types.

21. The method of claim 19, wherein the one or more power preferences include a user preference on whether to operate in a power-conservation mode.

22. A method performed at a camera device having memory, one or more processors, and an image sensor, the method comprising:
while a wireless communication component of the camera device is deactivated:
capturing, with the image sensor, a plurality of images containing a motion event;
characterizing the motion event, including determining whether the motion event involved a person; and
determining, based on the characterization of the motion event, whether to send one or more of the plurality of images to a remote computing system;
in accordance with a determination to send the one or more of the plurality of images to the remote computing system:
activating the wireless communication component of the camera device;
establishing a wireless connection to the remote computing system via the wireless communication component; and
sending data relating to the one or more of the plurality of images to the remote computing system via the established wireless connection; and
wherein the camera device comprises a doorbell, and
wherein the determination of whether to send the one or more of the plurality of images to the remote computing system is based on whether the doorbell is activated proximate in time to the motion event.

23. The method of claim 1, wherein characterizing the motion event comprises determining whether the motion event involves a person.

24. A method performed at a camera device having memory, one or more processors, and an image sensor, the method comprising:

while a wireless communication component of the camera device is deactivated:
  capturing, with the image sensor, a plurality of images containing a motion event;
  characterizing the motion event, including determining whether the motion event involved a person; and
  determining, based on the characterization of the motion event, whether to send one or more of the plurality of images to a remote computing system;
in accordance with a determination to send the one or more of the plurality of images to the remote computing system:
  activating the wireless communication component of the camera device;
  establishing a wireless connection to the remote computing system via the wireless communication component; and
  sending data relating to the one or more of the plurality of images to the remote computing system via the established wireless connection; and
wherein characterizing the motion event further comprises, in accordance with a determination that the motion event involves the person, determining whether the person is a known person.

25. The method of claim 1, wherein characterizing the motion event comprises determining whether the motion event comprises a known motion event.

26. The method of claim 1, wherein characterizing the motion event comprises determining whether the motion event comprises movement toward the camera device.

27. The method of claim 1, wherein the motion event is characterized based on context information.

28. The method of claim 1, wherein deactivating the image sensor comprises disabling the image sensor.

29. A camera device, comprising:
one or more processors;
an image sensor; and
memory storing one or more instructions that, when executed by the one or more processors, cause the camera device to:
  while a wireless communication component of the camera device is deactivated:
    capture, with the image sensor, a plurality of images, two or more of the plurality of images including a motion event;
    characterize the motion event based on at least one of the plurality of images;
    deactivate the image sensor in accordance with a determination, based on the characterization of the motion event, to not to continue to capture additional images via the image sensor; and
    determine, based on the characterization of the motion event, whether to send one or more of the plurality of images to a remote computing system; and
  in accordance with a determination to send the one or more of the plurality of images to the remote computing system:
    activate the wireless communication component of the camera device;
    establish a wireless connection to the remote computing system via the wireless communication component; and
    send data relating to the one or more of the plurality of images to the remote computing system via the established wireless connection.

30. A non-transitory computer-readable storage medium storing one or more programs, the one or more programs comprising instructions which, when executed by a camera device with one or more processors, memory, and an image sensor, cause the camera device to:
while a wireless communication component of the camera device is deactivated:
  capture, with the image sensor, a plurality of images, two or more of the plurality of images including a motion event;
  characterize the motion event based on at least one of the plurality of images;
  deactivate the image sensor in accordance with a determination, based on the characterization of the motion event, to not continue to capture additional images via the image sensor; and
  determine, based on the characterization of the motion event, whether to send one or more of the plurality of images to a remote computing system; and
in accordance with a determination to send the one or more of the plurality of images to the remote computing system:
  activate the wireless communication component of the camera device;
  establish a wireless connection to the remote computing system via the wireless communication component; and
  send data relating to the one or more of the plurality of images to the remote computing system via the established wireless connection.

* * * * *